(12) United States Patent
Kawai

(10) Patent No.: US 12,186,862 B2
(45) Date of Patent: Jan. 7, 2025

(54) ELECTRIC WORK MACHINE

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 6 days.

(21) Appl. No.: 18/196,497

(22) Filed: May 12, 2023

(65) Prior Publication Data

US 2023/0415309 A1   Dec. 28, 2023

(30) Foreign Application Priority Data

Jun. 27, 2022   (JP) .................. 2022-102533

(51) Int. Cl.
| | | |
|---|---|---|
| B25B 21/00 | (2006.01) | |
| B25B 21/02 | (2006.01) | |
| B25F 5/02 | (2006.01) | |
| H02K 5/173 | (2006.01) | |
| H02K 7/08 | (2006.01) | |
| H02K 7/14 | (2006.01) | |

(52) U.S. Cl.
CPC ............ B25B 21/002 (2013.01); B25B 21/02 (2013.01); B25F 5/02 (2013.01); H02K 5/1732 (2013.01); H02K 7/083 (2013.01); H02K 7/145 (2013.01)

(58) Field of Classification Search
CPC ......... B25B 21/002; B25B 21/02; B25F 5/02; H02K 5/1732; H02K 7/083; H02K 7/145

USPC .......................................................... 173/93
See application file for complete search history.

(56) References Cited

U.S. PATENT DOCUMENTS

| | | | | |
|---|---|---|---|---|
| 8,069,929 | B2 * | 12/2011 | Sugimoto ............. | B25B 21/026 81/463 |
| 2006/0163824 | A1 * | 7/2006 | Sasaki ................. | B23B 31/1071 279/75 |
| 2016/0336838 | A1 * | 11/2016 | Kouda ................... | H02K 1/146 |
| 2018/0222022 | A1 * | 8/2018 | Kumagai ............. | B25D 11/104 |
| 2019/0262978 | A1 * | 8/2019 | Tejima ................. | B25B 21/026 |
| 2020/0009709 | A1 * | 1/2020 | Kumagai ................ | B25B 19/00 |
| 2020/0215678 | A1 * | 7/2020 | Nakashima ............ | B25F 5/006 |
| 2020/0217412 | A1 * | 7/2020 | Nakashima ........... | F16H 57/082 |
| 2021/0016428 | A1 * | 1/2021 | Nakashima .............. | B25F 5/02 |
| 2021/0023629 | A1 * | 1/2021 | Kawai .................... | B25D 16/00 |
| 2021/0060755 | A1 * | 3/2021 | Kawai ...................... | B25F 5/00 |
| 2021/0094158 | A1 * | 4/2021 | Kato ...................... | B25B 23/147 |
| 2021/0162571 | A1 * | 6/2021 | Kondo .................. | B25B 21/026 |
| 2021/0187707 | A1 * | 6/2021 | Smith ....................... | B25F 5/02 |
| 2021/0213593 | A1 * | 7/2021 | Ichikawa ................ | B25B 21/02 |
| 2022/0395911 | A1 * | 12/2022 | Tamura ................... | B23B 45/02 |
| 2023/0147598 | A1 * | 5/2023 | Tamura ................... | B25B 23/18 81/54 |

(Continued)

Primary Examiner — Dariush Seif
(74) Attorney, Agent, or Firm — Oliff PLC

(57) ABSTRACT

An electric work machine has less size increase. An electric work machine includes a motor including a stator and a rotor at least partially located radially inward from the stator and rotatable about a rotation axis, a spindle located frontward from the stator in a front-rear direction parallel to the rotation axis and rotatable under a rotational force generated by the rotor, and a spindle bearing supporting a rear portion of the spindle in a rotatable manner. The spindle bearing is located radially inward from the stator.

14 Claims, 23 Drawing Sheets

(56) References Cited

U.S. PATENT DOCUMENTS

| | | | |
|---|---|---|---|
| 2023/0173650 A1* | 6/2023 | Shinto | B25F 5/00 173/2 |
| 2023/0202004 A1* | 6/2023 | Tamura | B25B 21/026 173/93 |
| 2023/0415309 A1* | 12/2023 | Kawai | B25F 5/02 |

* cited by examiner

FIG. 2
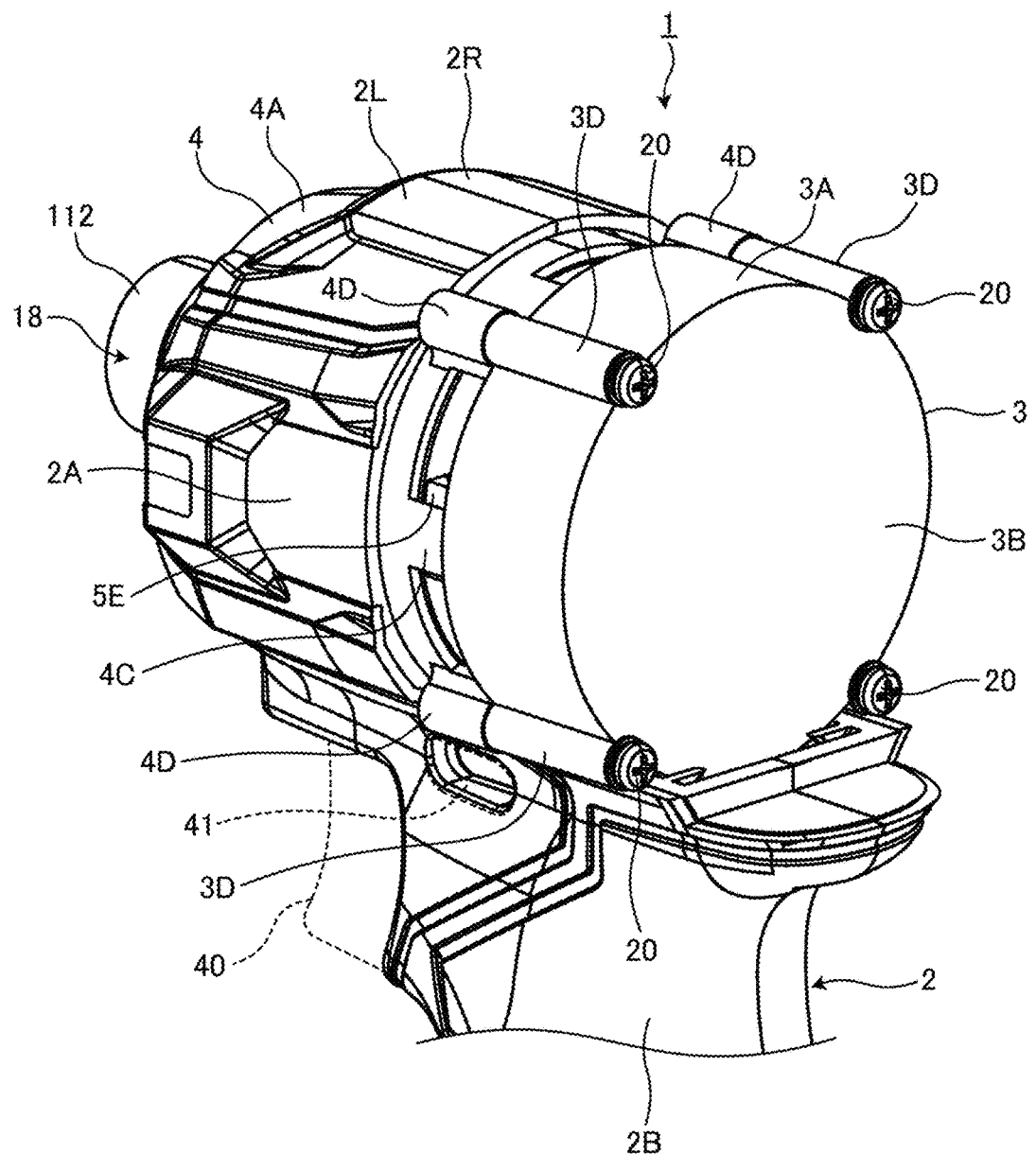
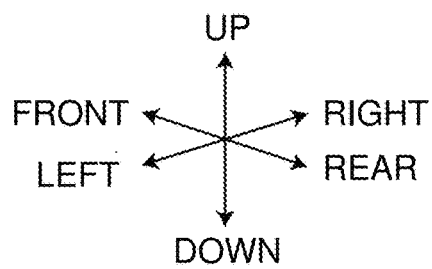

ELECTRIC WORK MACHINE

CROSS-REFERENCE TO RELATED APPLICATIONS

This application claims the benefit of priority to Japanese Patent Application No. 2022-102533, filed on Jun. 27, 2022, the entire contents of which are hereby incorporated by reference.

BACKGROUND

1. Technical Field

The present disclosure relates to an electric work machine.

2. Description of the Background

In the technical field of impact tools, a known power tool is described in U.S. Patent Application Publication No. 2021/0187707.

BRIEF SUMMARY

For improved operability of an electric work machine, a technique is awaited for reducing an increase in the size of the electric work machine.

One or more aspects of the present disclosure are directed to an electric work machine with less size increase.

A first aspect of the present disclosure provides an electric work machine, including:
 a motor including
  a stator, and
  a rotor at least partially located radially inward from the stator, the rotor being rotatable about a rotation axis;
 a spindle located frontward from the stator in a front-rear direction parallel to the rotation axis, the spindle being rotatable under a rotational force generated by the rotor; and
 a spindle bearing supporting a rear portion of the spindle in a rotatable manner, the spindle bearing being located radially inward from the stator.

The electric work machine according to the above aspect of the present disclosure has less size increase.

BRIEF DESCRIPTION OF DRAWINGS

FIG. 2 is a partial perspective view of the electric work machine according to the embodiment as viewed from the rear.

DETAILED DESCRIPTION

One or more embodiments will now be described with reference to the drawings. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine. The electric work machine includes a motor 6 as a power source.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

A predetermined axial direction away from the center of the electric work machine, or a position farther from the center of the electric work machine in the predetermined axial direction, is referred to as a first axial direction for convenience. The direction opposite to the first axial direction is referred to as a second axial direction for convenience. A predetermined circumferential direction is referred to as a first circumferential direction for convenience. The direction opposite to the first circumferential direction is referred to as a second circumferential direction for convenience. A radial direction away from the rotation axis AX, or a position farther from the rotation axis AX in the radial direction, is referred to as radially outward for convenience.

The direction opposite to radially outward is referred to as radially inward for convenience.

In the embodiments, the axial direction corresponds to the front-rear direction. The first axial direction is from the rear to the front, and the second axial direction is from the front to the rear.

Electric Work Machine

Figure 1:
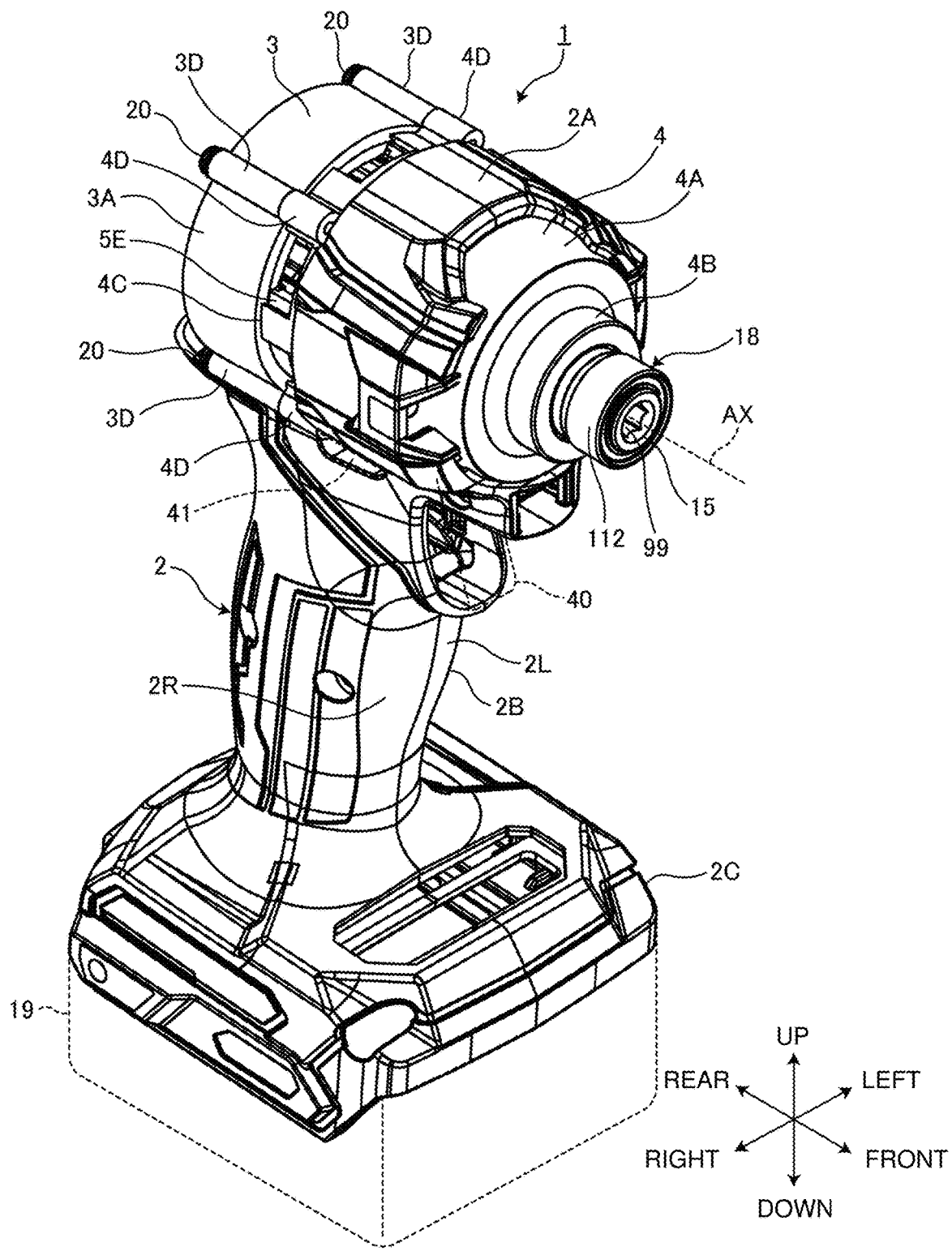
FIG. 1 is a perspective view of an electric work machine according to an embodiment as viewed from the front.
Figure 3:
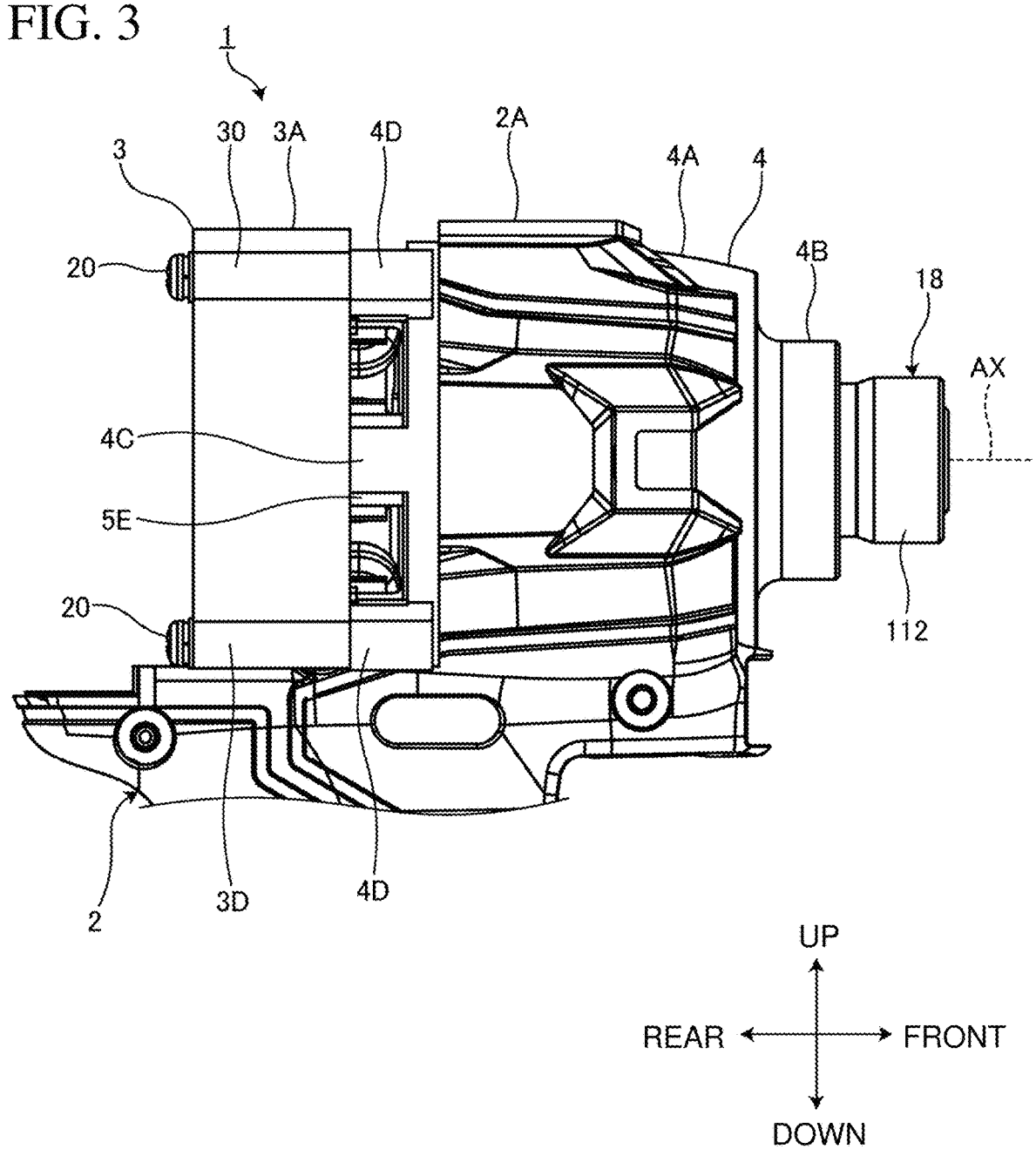
FIG. 3 is a partial side view of the electric work machine according to the embodiment.
Figure 4:
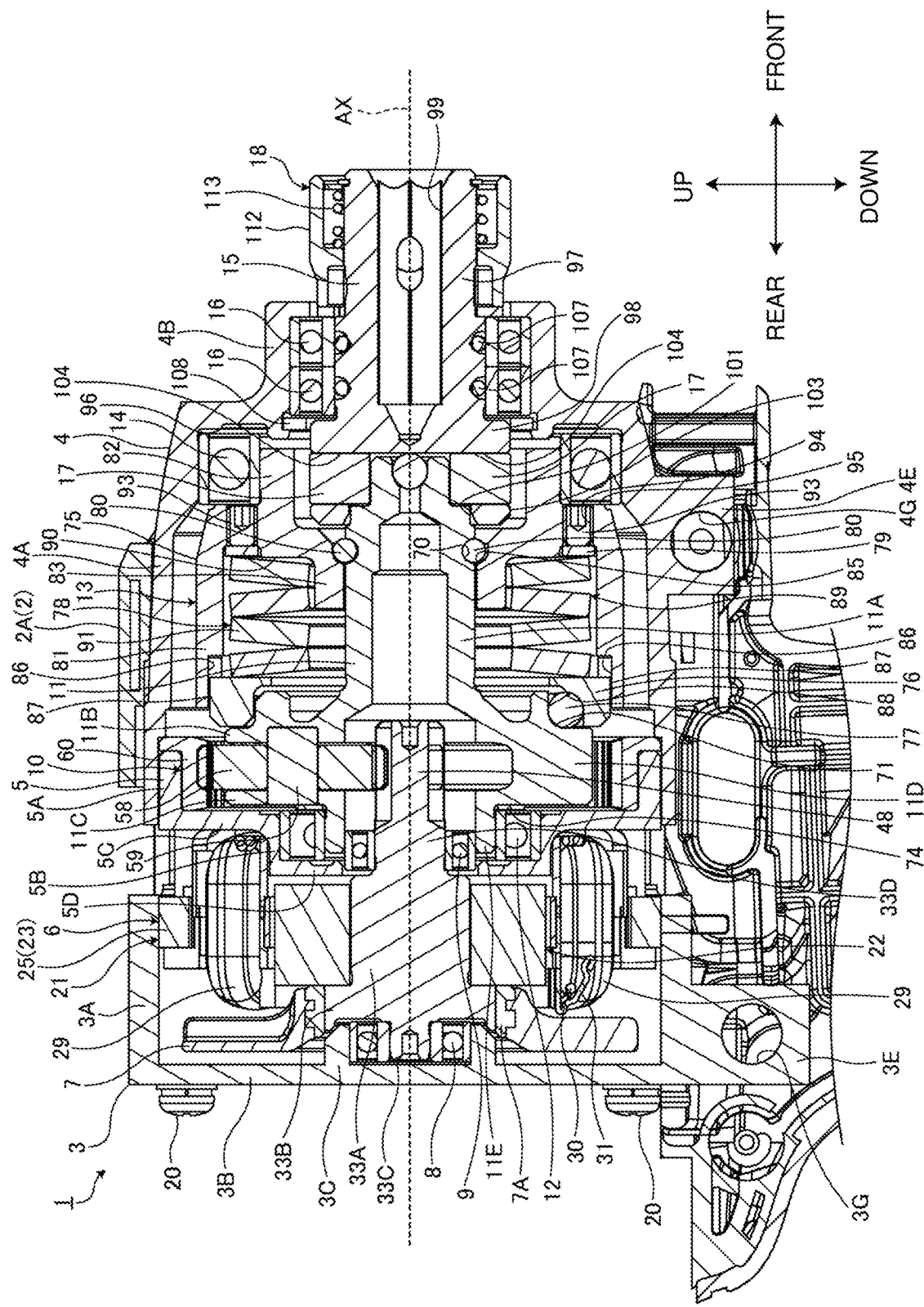
FIG. 4 is a partial longitudinal sectional view of the electric work machine according to the embodiment.
Figure 5:
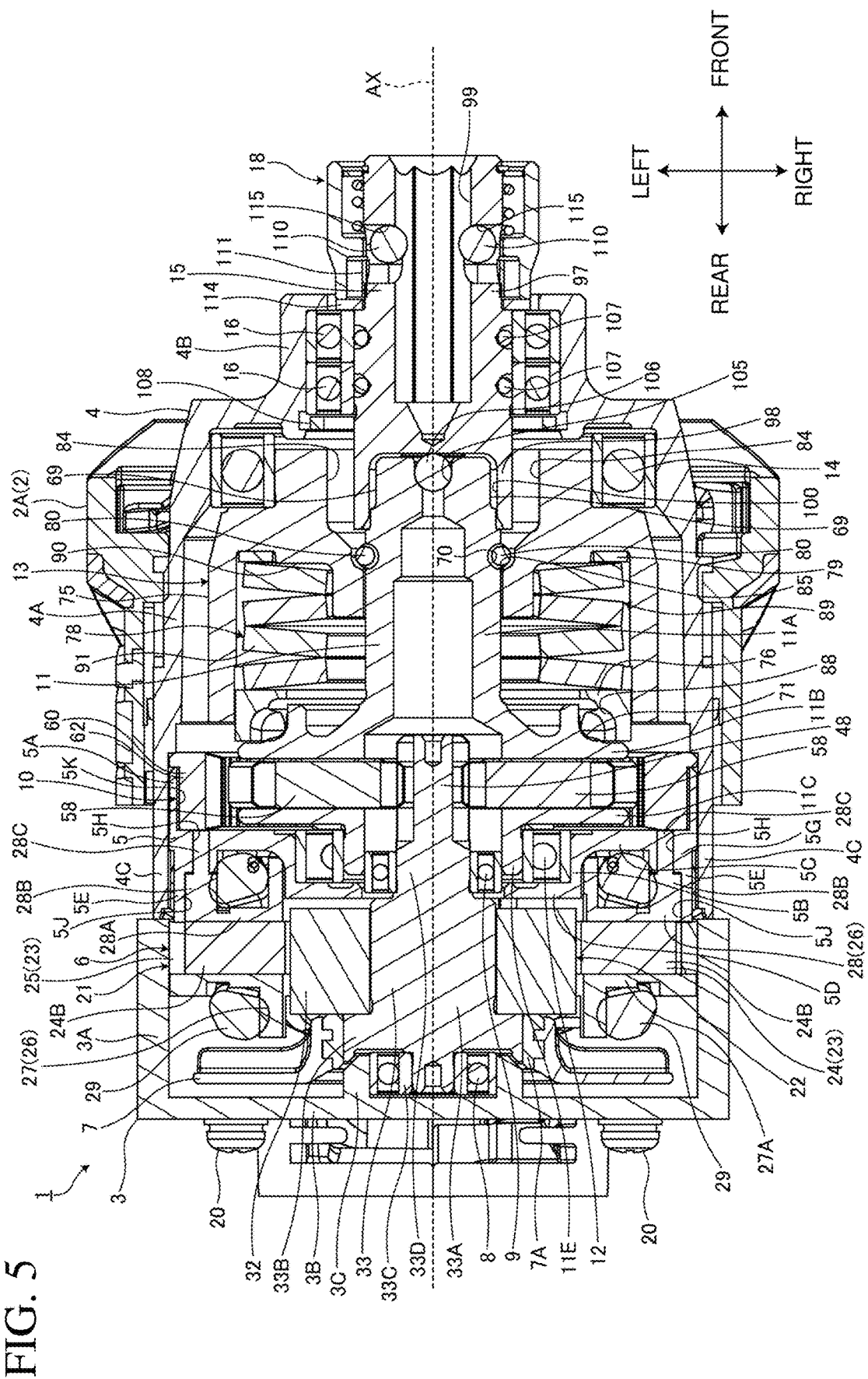
FIG. 5 is a partial horizontal sectional view of the electric work machine according to the embodiment.
Figure 6:
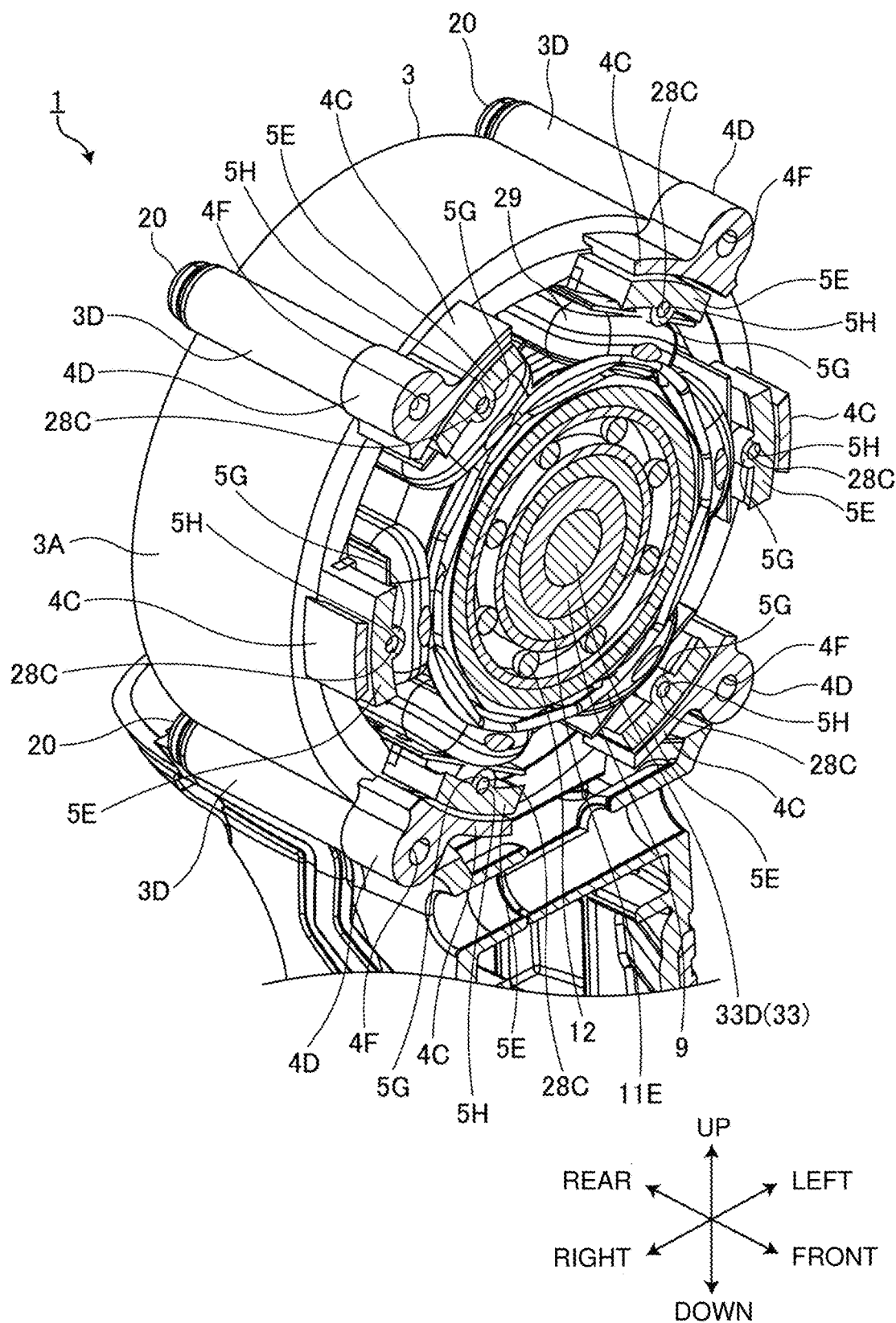
FIG. 6 is a partial perspective sectional view of the electric work machine according to the embodiment.
Figure 7:
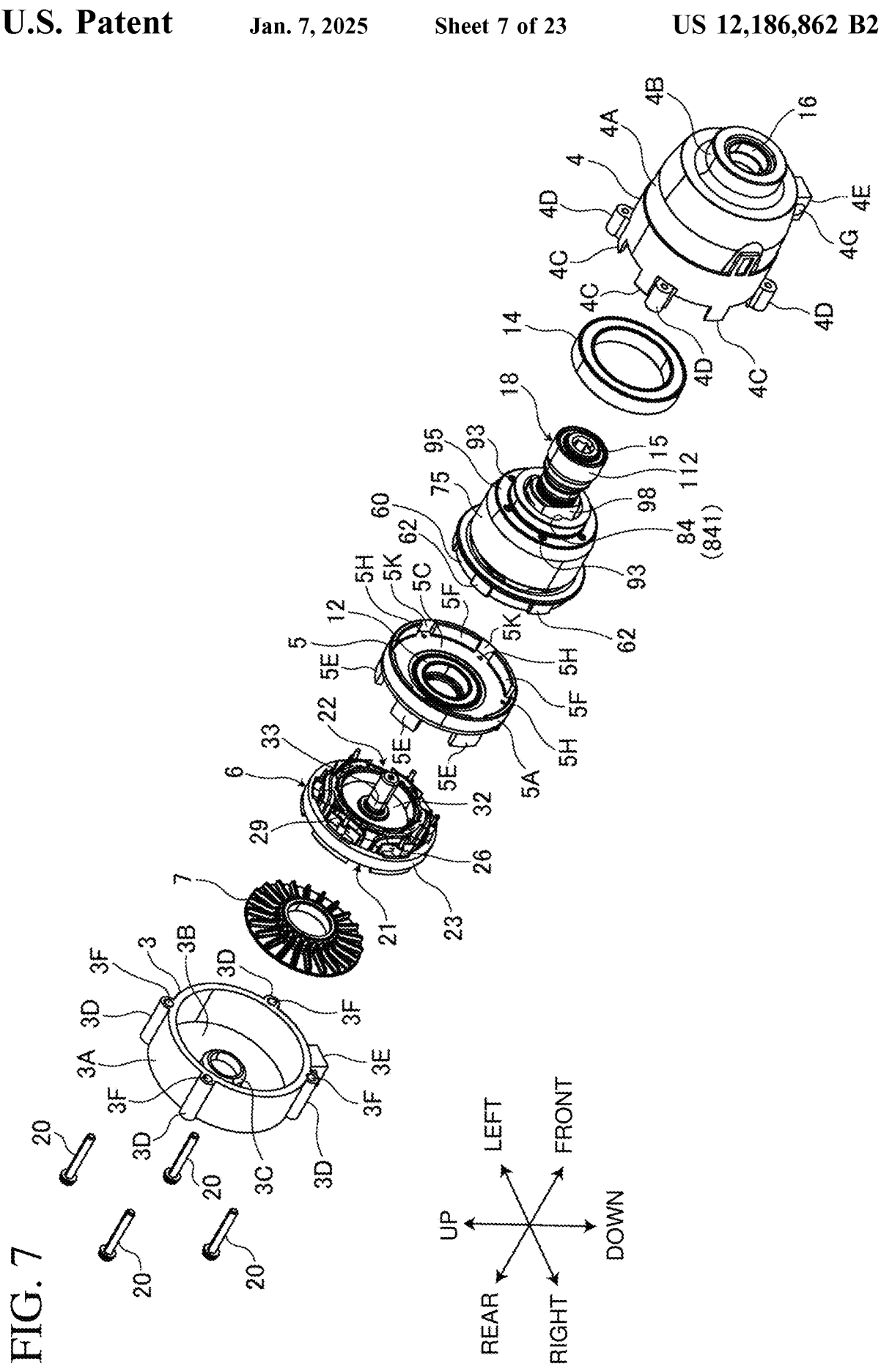
FIG. 7 is a partially exploded perspective view of the electric work machine according to the embodiment as viewed from the front.
Figure 8:
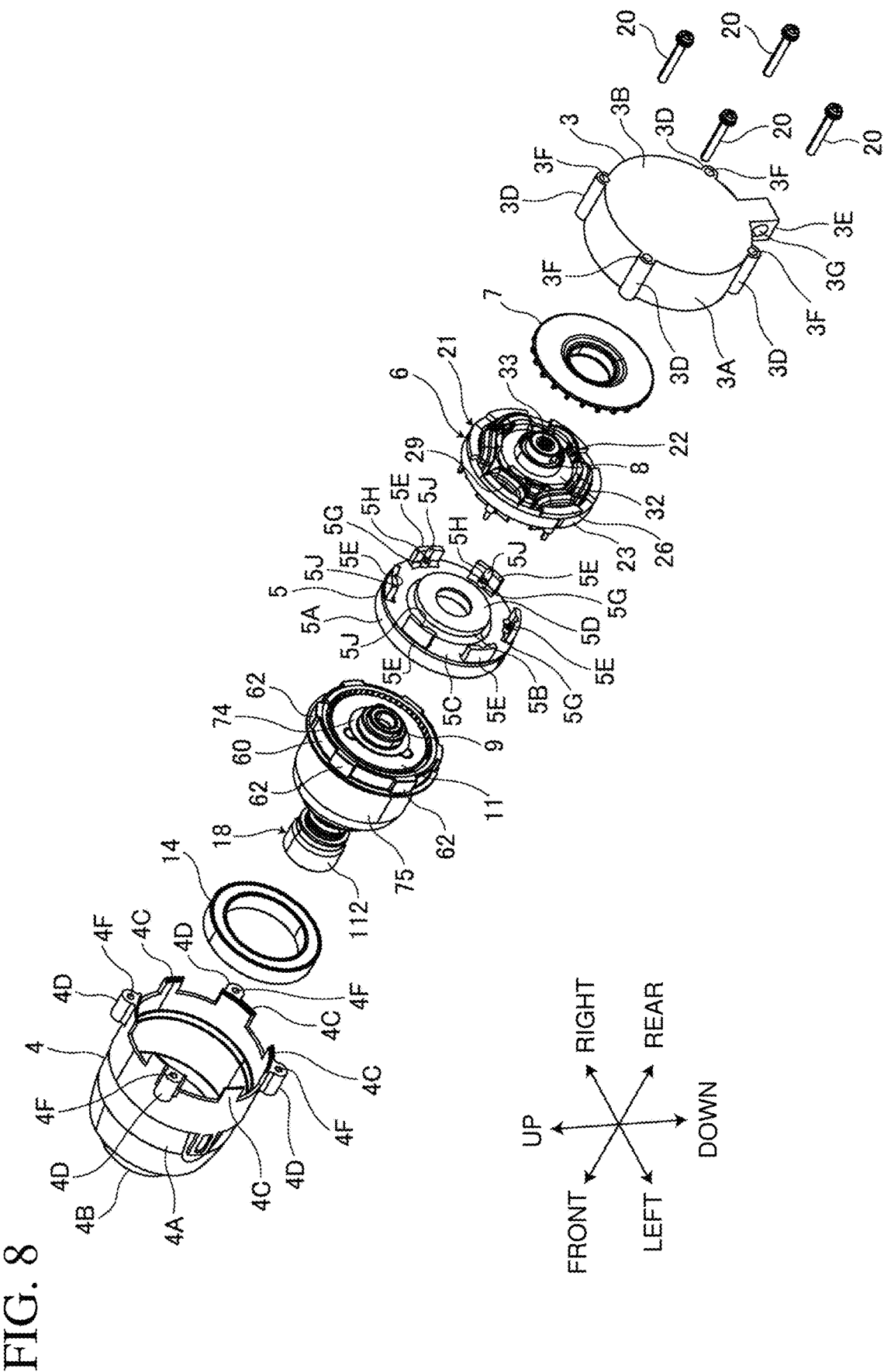
FIG. 8 is a partially exploded perspective view of the electric work machine according to the embodiment as viewed from the rear.

FIG. 1 is a perspective view of an electric work machine 1 according to an embodiment as viewed from the front. FIG. 2 is a partial perspective view of the electric work machine 1 as viewed from the rear. FIG. 3 is a partial side view of the electric work machine 1. FIG. 4 is a partial longitudinal sectional view of the electric work machine 1. FIG. 5 is a partial horizontal sectional view of the electric work machine 1. FIG. 6 is a partial perspective sectional view of the electric work machine 1. FIG. 7 is a partially exploded perspective view of the electric work machine 1 as viewed from the front. FIG. 8 is a partially exploded perspective view of the electric work machine 1 as viewed from the rear. The electric work machine 1 according to the embodiment is an impact driver as an example of a power tool.

The electric work machine 1 includes a housing 2, a rear case 3, a hammer case 4, a bearing box 5, the motor 6, a fan 7, a rear rotor bearing 8, a front rotor bearing 9, a reducer 10, a spindle 11, a spindle bearing 12, a striker 13, a hammer bearing 14, a tool holding shaft 15, shaft bearings 16, movable anvils 17, and a tool holder 18.

The housing 2 accommodates at least parts of components of the electric work machine 1. The housing 2 is formed from a synthetic resin. The housing 2 in the embodiment is formed from nylon. The housing 2 includes a pair of housing halves. The housing 2 includes a left housing 2L and a right housing 2R. The right housing 2R is located on the right of the left housing 2L. The left and right housings 2L and 2R are fastened together with multiple screws (not shown).

The housing 2 includes a compartment 2A, a grip 2B, and a battery holder 2C.

The compartment 2A covers the hammer case 4. The compartment 2A may cover both the rear case 3 and the hammer case 4. The compartment 2A is cylindrical.

The grip 2B is grippable by an operator. The grip 2B extends downward from the compartment 2A.

The battery holder 2C holds a battery pack 19. A battery mount is located in a lower portion of the battery holder 2C. The battery holder 2C holds the battery pack 19 with the battery mount. The battery pack 19 is attachable to and detachable from the battery mount. The battery holder 2C is connected to the lower end of the grip 2B.

The rear case 3 accommodates at least a part of the motor 6 and the fan 7. The rear case 3 is formed from a synthetic resin. The rear case 3 in the embodiment is formed from nylon.

The rear case 3 includes a cylindrical portion 3A, a disk 3B, a bearing retainer 3C, screw bosses 3D, and a protrusion 3E.

The cylindrical portion 3A surrounds the rotation axis AX. The disk 3B covers an opening at the rear end of the cylindrical portion 3A.

The bearing retainer 3C is located at the center of the front surface of the disk 3B. The bearing retainer 3C protrudes frontward from the front surface of the disk 3B. The bearing retainer 3C is cylindrical. The rear rotor bearing 8 is held by the bearing retainer 3C.

The screw bosses 3D are located on the outer circumferential surface of the cylindrical portion 3A. Four screw bosses 3D are located circumferentially at intervals. Each screw boss 3D has a screw opening 3F for receiving an intermediate portion of a screw 20.

The protrusion 3E protrudes downward from a lower portion of the outer circumferential surface of the cylindrical portion 3A. The protrusion 3E is engaged with at least a part of the housing 2. The protrusion 3E has a screw opening 3G. A screw (not shown) placed into the screw opening 3G is fastened to the housing 2. This restricts relative circumferential movement between the rear case 3 and the housing 2.

The hammer case 4 accommodates the reducer 10, the spindle 11, the striker 13, the movable anvils 17, the spindle bearing 12, the hammer bearing 14, and the shaft bearings 16. The hammer case 4 is formed from a metal. Examples of the metal for the hammer case 4 include iron, aluminum, and magnesium.

The hammer case 4 is cylindrical. The hammer case 4 includes a large cylindrical portion 4A, a small cylindrical portion 4B, tabs 4C, screw bosses 4D, and a protrusion 4E.

Each of the large cylindrical portion 4A and the small cylindrical portion 4B surrounds the rotation axis AX. The small cylindrical portion 4B is located frontward from the large cylindrical portion 4A. The large cylindrical portion 4A has a larger inner diameter than the small cylindrical portion 4B. The large cylindrical portion 4A has a larger outer diameter than the small cylindrical portion 4B. The tabs 4C protrude rearward from the rear surface of the large cylindrical portion 4A.

The tabs 4C are located circumferentially at intervals. Each tab 4C has the rear end face in contact with the front end face of the cylindrical portion 3A.

The screw bosses 4D are located on the outer circumferential surface of the large cylindrical portion 4A. Four screw bosses 4D are located circumferentially at intervals. The screw 20 has a front end placed into a threaded hole 4F in each screw boss 4D. With the screw 20 placed into the screw opening 3F in each screw boss 3D from behind the corresponding screw boss 3D, a threaded portion at the front end of the screw 20 is fastened to the threaded hole 4F in the corresponding screw boss 4D. The rear case 3 and the hammer case 4 are fastened to each other with the screws 20 to restrict relative movement between the rear case 3 and the hammer case 4.

The protrusion 4E protrudes downward from a lower portion of the outer circumferential surface of the large cylindrical portion 4A. The protrusion 4E is engaged with at least a part of the housing 2. The protrusion 4E has a screw opening 4G. A screw (not shown) placed into the screw opening 4G is fastened to the housing 2. This restricts relative circumferential movement between the hammer case 4 and the housing 2.

The bearing box 5 covers an opening at the rear end of the large cylindrical portion 4A. The bearing box 5 holds the spindle bearing 12.

The bearing box 5 includes a large cylindrical portion 5A, a small cylindrical portion 5B, a front annular portion 5C, a rear annular portion 5D, tabs 5E, rotation locking portions 5F, and bosses 5G.

Each of the large cylindrical portion 5A and the small cylindrical portion 5B surrounds the rotation axis AX. The small cylindrical portion 5B is located rearward from the large cylindrical portion 5A. The large cylindrical portion 5A has a larger inner diameter than the small cylindrical portion 5B. The large cylindrical portion 5A has a larger outer diameter than the small cylindrical portion 5B.

The front annular portion 5C connects the rear end of the large cylindrical portion 5A with the front end of the small cylindrical portion 5B. The front annular portion 5C has an outer edge connected to the rear end of the large cylindrical portion 5A. The front annular portion 5C has an inner edge connected to the front end of the small cylindrical portion 5B.

The rear annular portion 5D is located at the rear end of the small cylindrical portion 5B. The rear annular portion 5D has an outer edge connected to the rear end of the small cylindrical portion 5B.

The spindle bearing 12 is located radially inward from the small cylindrical portion 5B. The small cylindrical portion 5B has an inner circumferential surface in contact with the outer circumferential surface of an outer ring of the spindle bearing 12. The spindle bearing 12 has the rear end supported by the front surface of the rear annular portion 5D.

The tabs 5E protrude rearward from a circumferential edge of the rear surface of the front annular portion 5C. The tabs 5E are located circumferentially at intervals. Each tab 5E has the rear end face in contact with the front end face of an outer core 25 (described later).

The bosses 5G protrude rearward from the rear surface of the front annular portion 5C. The bosses 5G are located circumferentially at intervals. Each boss 5G is integral with the inner surface of the corresponding tab 5E facing radially inward. Each boss 5G has an insertion hole 5H receiving a pin 28C included in an insulator 26 (described later).

The rear end face of each tab 5E is located rearward from the rear end face of the corresponding boss 5G. Each tab 5E has a recess 5J on its inner surface rearward from the rear end face of the corresponding boss 5G. The recess 5J is recessed radially outward from the inner surface of each tab 5E. The recess 5J extends in the front-rear direction. The pin 28C is placed into the corresponding insertion hole 5H from the rear of the corresponding boss 5G.

When the pins 28C are placed into the insertion holes 5H, columnar portions 28B (described later) are guided by the recesses 5J. With the pins 28C placed in the insertion holes 5H, the columnar portions 28B are supported by the recesses 5J. The pins 28C placed into the insertion holes 5H restrict relative circumferential movement and relative front-rear movement between the bearing box 5 and a stator 21.

The motor 6 is a power source for the electric work machine 1. The motor 6 is an electric motor drivable with power supplied from the battery pack 19. The motor 6 is an inner-rotor brushless motor.

The motor 6 includes the stator 21 and a rotor 22. The stator 21 is supported by the rear case 3. The rotor 22 is at least partially located inward from the stator 21. The rotor 22 rotates relative to the stator 21. The rotor 22 rotates about the rotation axis AX extending in the front-rear direction.

Figure 9:
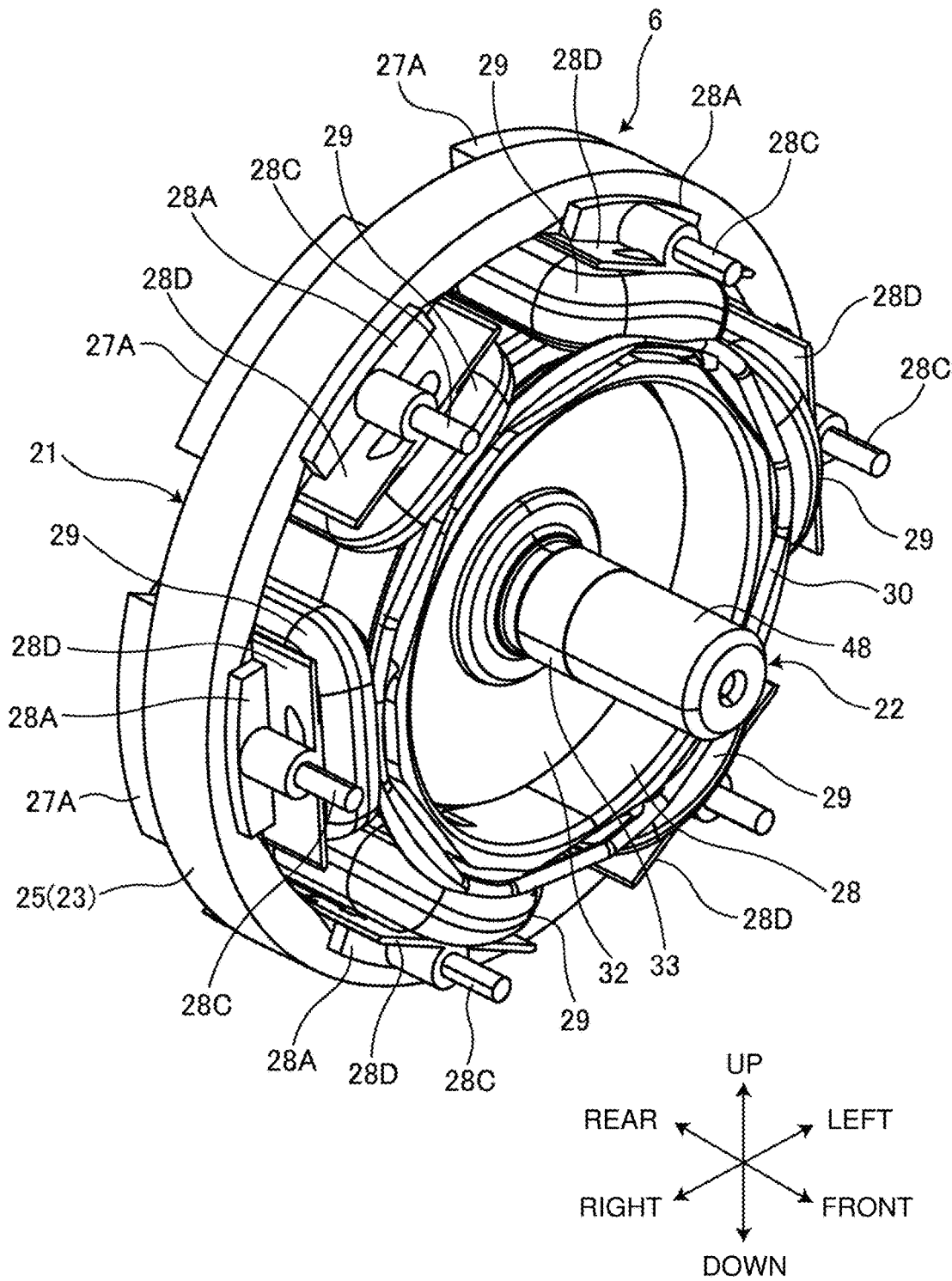
FIG. 9 is a perspective view of a motor in the embodiment as viewed from the front.
Figure 10:
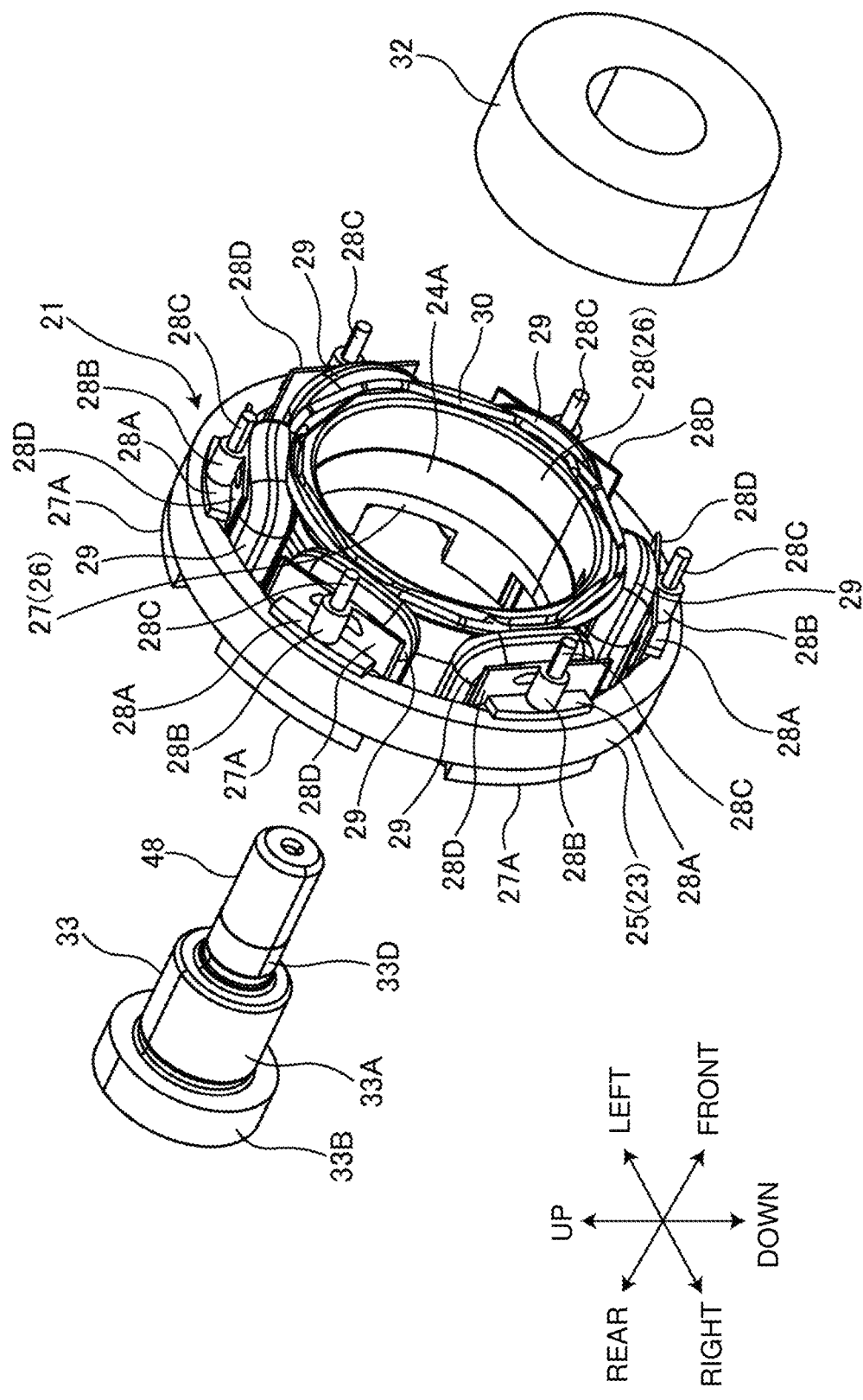
FIG. 10 is an exploded perspective view of the motor in the embodiment as viewed from the front.
Figure 11:
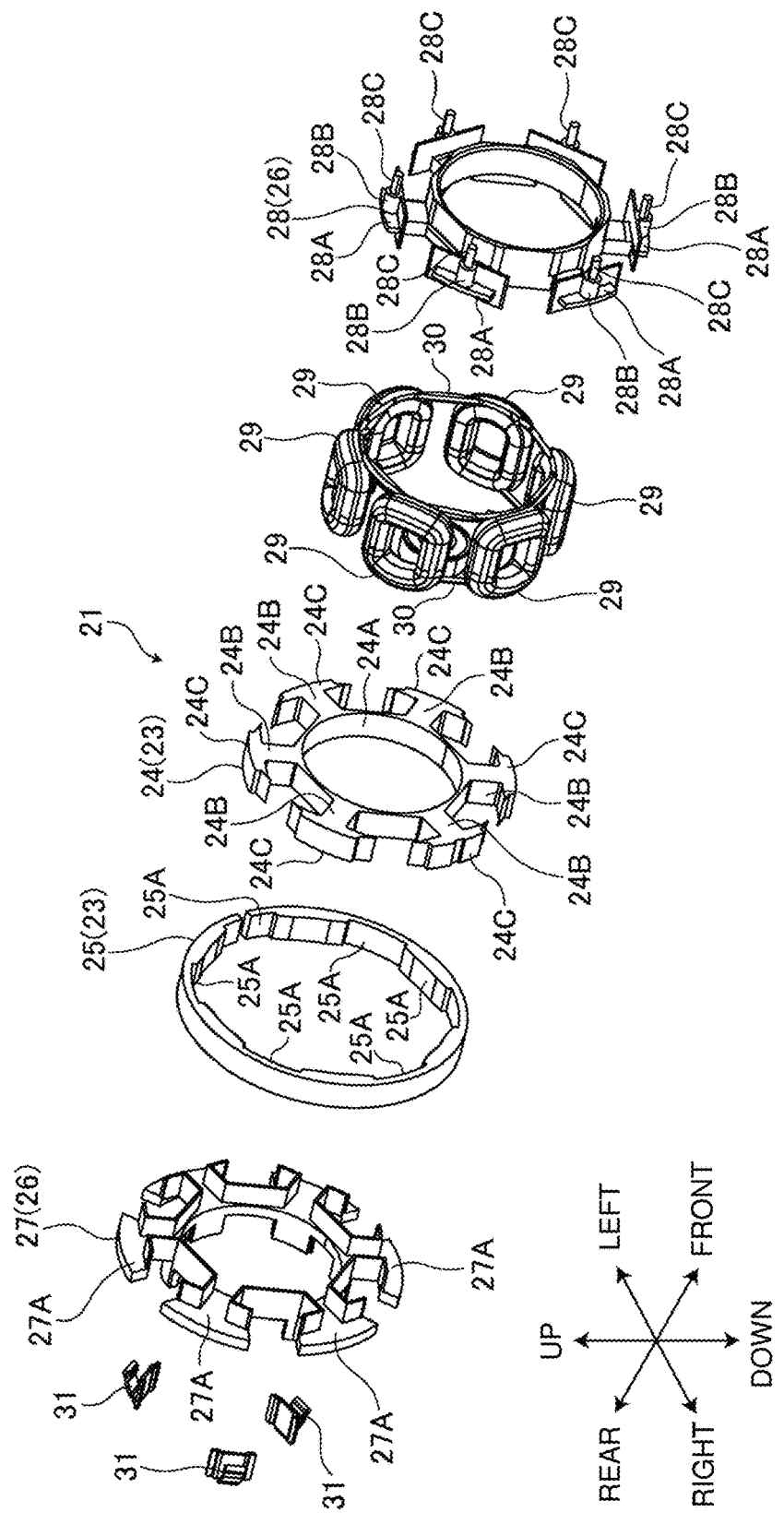
FIG. 11 is an exploded perspective view of a stator in the embodiment as viewed from the front.

FIG. 9 is a perspective view of the motor 6 in the embodiment as viewed from the front. FIG. 10 is an exploded perspective view of the motor 6 as viewed from the front. FIG. 11 is an exploded perspective view of the stator 21 as viewed from the front.

The stator 21 includes a stator core 23, the insulator 26, and coils 29. The stator core 23 is located radially outward from the rotor 22. The stator core 23 includes multiple steel plates stacked on one another. The steel plates are metal plates formed from iron as a main component. The insulator 26 covers at least a part of a surface of the stator core 23. The insulator 26 is fixed to the stator core 23. The insulator 26 is an electrical insulating member formed from a synthetic resin.

The stator core 23 in the embodiment includes an inner core 24 and the outer core 25. The outer core 25 surrounds the inner core 24.

The inner core 24 includes an inner yoke 24A, teeth 24B, and joints 24C.

The inner yoke 24A is annular.

The teeth 24B protrude radially outward from the outer circumferential surface of the inner yoke 24A. The teeth 24B are located circumferentially at intervals.

The joints 24C are connected to the radial outer ends of the teeth 24B. The joints 24C have a larger circumferential dimension than the teeth 24B. Each joint 24C extends from the radial outer end of the corresponding tooth 24B in the first circumferential direction and the second radial direction.

The outer core 25 is substantially annular. The outer core 25 has recesses 25A on its radially inner circumferential surface. Each joint 24C is at least partially located in the corresponding recess 25A.

This connects the inner core 24 with the outer core 25. The inner core 24 and the outer core 25 are connected and integral with each other, thus forming the stator core 23.

The insulator 26 in the embodiment includes a rear insulator portion 27 and a front insulator portion 28. The rear insulator portion 27 is fixed to a rear portion of the stator core 23. The front insulator portion 28 is fixed to a front portion of the stator core 23. The insulator 26 covers a surface of the inner core 24.

The rear insulator portion 27 includes rear plates 27A in contact with the rear end face of the outer core 25. The rear plates 27A are located circumferentially at intervals. Each rear plate 27A is located radially outward from the corresponding coil 29. Each rear plate 27A supports the outer periphery of the corresponding coil 29 facing radially outward.

The front insulator portion 28 includes support plates 28D, front plates 28A, the columnar portions 28B, and the pins 28C. The support plates 28D support the outer peripheries of the coils 29. The front plates 28A are in contact with the front end face of the inner core 24. The columnar portions 28B protrude frontward from the front surfaces of the front plates 28A. The pins 28C protrude frontward from the front ends of the columnar portions 28B. The support plates 28D are located circumferentially at intervals. Each of the front plates 28A and the columnar portions 28B is fixed to the outer surface of the corresponding support plate 28D facing radially outward. The pins 28C are located frontward from the front ends of the support plates 28D. The pins 28C have a smaller thickness than the columnar portions 28B.

Each coil 29 is attached to the stator core 23 with the insulator 26 in between. Each coil 29 surrounds the corresponding tooth 24B with the rear insulator portion 27 and the front insulator portion 28 in between. The insulator 26 electrically insulates the coils 29 from the stator core 23. The coils 29 are interconnected with connecting wires 30. A current from the battery pack 19 is supplied to the coils 29 through fusing terminals 31 and the connecting wires 30.

The rotor 22 rotates about the rotation axis AX. The rotor 22 includes a rotor magnet 32 and a rotor shaft 33.

The rotor shaft 33 is formed from steel. The rotor shaft 33 is fixed to the rotor magnet 32. The rotor magnet 32 is cylindrical. The rotor shaft 33 is located radially inward from the rotor magnet 32.

The rotor shaft 33 includes a magnet fixing portion 33A, a fan fixing portion 33B, a rear support 33C, and a front support 33D. The rotor magnet 32 is fixed to the magnet fixing portion 33A. The fan fixing portion 33B is located rearward from the rear end face of the rotor magnet 32. The rear support 33C protrudes rearward from the rear end face of the fan fixing portion 33B. The front support 33D is located frontward from the front end face of the rotor magnet 32.

The fan fixing portion 33B has a larger diameter than the magnet fixing portion 33A. Each of the rear support 33C and the front support 33D has a smaller diameter than the magnet fixing portion 33A. The rear support 33C has a smaller diameter than the front support 33D.

The rear support 33C is rotatably supported by the rear rotor bearing 8. The front support 33D is rotatably supported by the front rotor bearing 9. The rear rotor bearing 8 is held by the bearing retainer 3C in the rear case 3. The front rotor bearing 9 is held by the spindle 11. The rotor shaft 33 has its front end located inside the spindle 11.

A pinion gear 48 is fixed to the front end of the rotor shaft 33. The pinion gear 48 is connected to at least apart of the reducer 10. The rotor shaft 33 is connected to the reducer 10 with the pinion gear 48.

The fan 7 generates an airflow for cooling the motor 6. The fan 7 is located rearward from the motor 6. The fan 7 is fixed to the fan fixing portion 33B with a bush 7A. The fan 7 rotates as the rotor 22 rotates. As the rotor shaft 33 rotates, the fan 7 rotates together with the rotor shaft 33. This generates an airflow around the motor 6 to cool the motor 6.

The reducer 10 connects the rotor shaft 33 and the spindle 11. The reducer 10 transmits rotation of the rotor 22 to the spindle 11. The reducer 10 rotates the spindle 11 at a lower rotational speed than the rotor shaft 33. The reducer 10 includes a planetary gear assembly.

Figure 12:
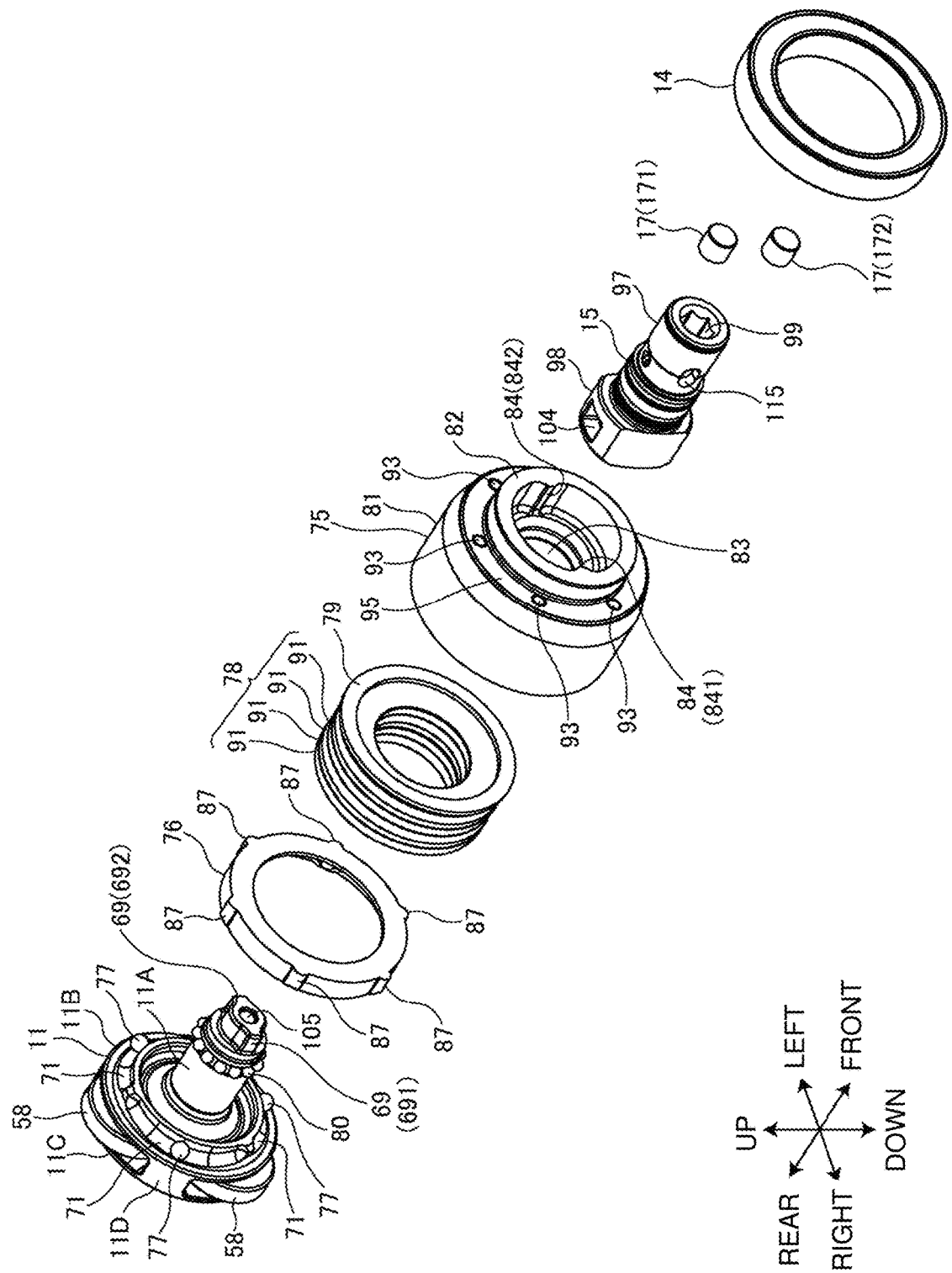
FIG. 12 is a partially exploded perspective view of the electric work machine according to the embodiment as viewed from the front.
Figure 13:
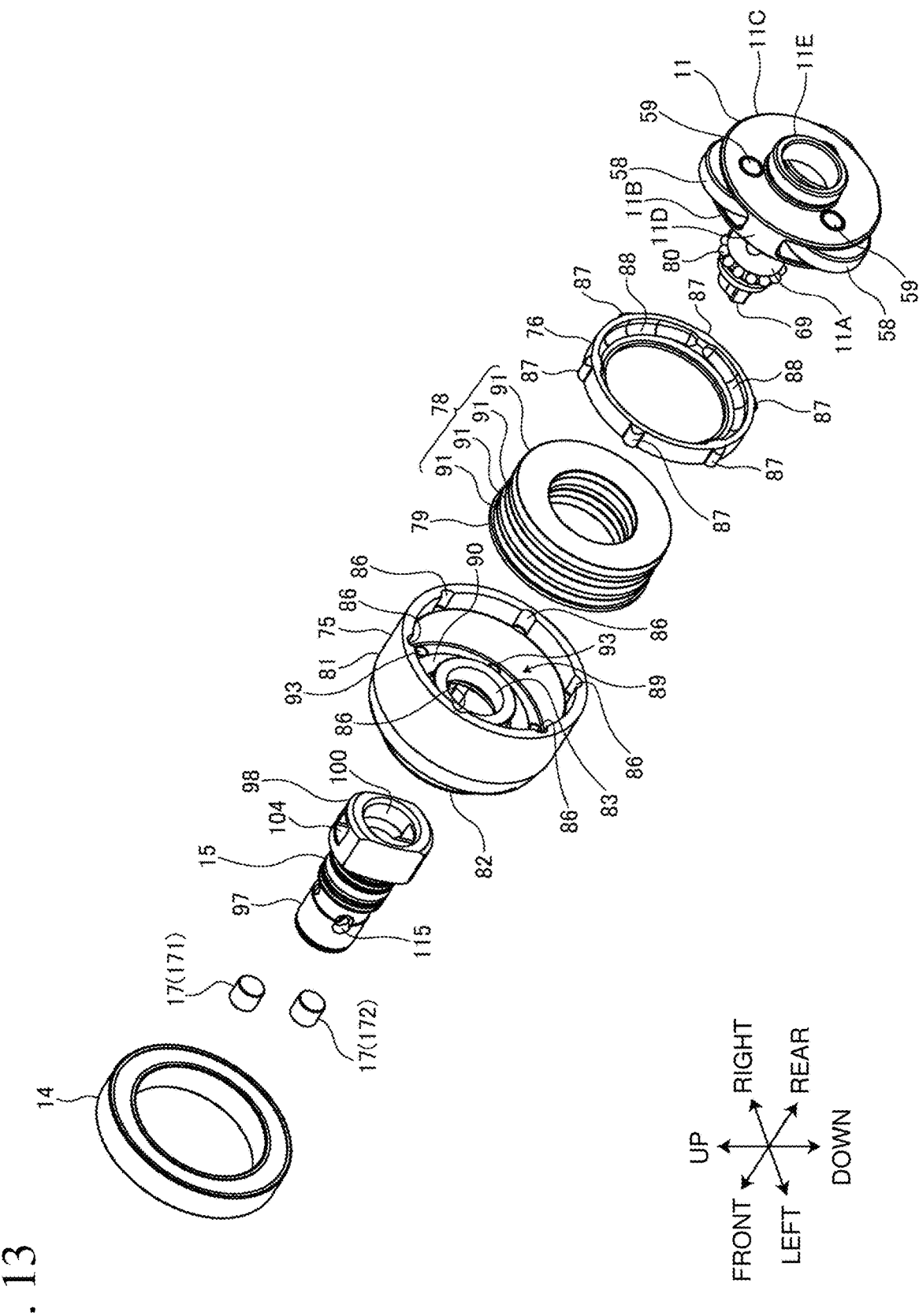
FIG. 13 is a partially exploded perspective view of the electric work machine according to the embodiment as viewed from the rear.

FIG. 12 is a partially exploded perspective view of the electric work machine 1 according to the embodiment as viewed from the front. FIG. 13 is a partially exploded perspective view of the electric work machine 1 as viewed from the rear.

The reducer 10 includes multiple planetary gears 58, pins 59, and an internal gear 60. The planetary gears 58 surround the pinion gear 48. The pins 59 support the planetary gears 58. The internal gear 60 surrounds the planetary gears 58. Each planetary gear 58 meshes with the pinion gear 48. The planetary gears 58 are rotatably supported by the spindle 11 with the pins 59. The spindle 11 is rotated by the planetary gears 58. The internal gear 60 has internal teeth that mesh with the planetary gears 58.

The internal gear 60 is fixed to the bearing box 5. As shown in FIGS. 7 and 8, the internal gear 60 includes protrusions 62 on its outer surface. The protrusions 62 protrude radially outward from the outer circumferential surface of the internal gear 60. The protrusions 62 are located circumferentially at intervals. As described above, the bearing box 5 includes the rotation locking portions 5F that are located circumferentially at intervals. A recess 5K is between adjacent two of the rotation locking portions 5F. Each protrusion 62 is received in the corresponding recess 5K. This restricts relative rotation between the bearing box 5 and the internal gear 60. The bearing box 5 is fixed to each of the rear case 3 and the hammer case 4 with the front insulator portion 28 in between. The internal gear 60 is constantly nonrotatable relative to the hammer case 4 and the rear case 3.

When the rotor shaft 33 rotates as driven by the motor 6, the pinion gear 48 rotates, and the planetary gears 58 revolve about the pinion gear 48. The planetary gears 58 revolve while meshing with the internal teeth on the internal gear 60. The revolving planetary gears 58 rotate the spindle 11 connected to the planetary gears 58 with the pins 59 at a lower rotational speed than the rotor shaft 33.

The spindle 11 rotates under a rotational force from the motor 6. The spindle 11 is at least partially located frontward from the reducer 10. The spindle 11 is located rearward from the tool holding shaft 15. The spindle 11 is rotatable by the rotor 22. The spindle 11 rotates under a rotational force from the rotor 22 transmitted by the reducer 10. The spindle 11 transmits the rotational force from the motor 6 to the tool holding shaft 15 through the striker 13.

The spindle 11 includes a spindle shaft 11A, a flange 11B, a pin support 11C, a joint 11D, and a raised portion 11E.

The spindle shaft 11A extends in the axial direction. The spindle shaft 11A surrounds the rotation axis AX. The spindle shaft 11A includes spindle projections 69 at the front end of its outer circumferential surface. The spindle projections 69 protrude radially outward from the front end of the outer circumferential surface of the spindle shaft 11A. The spindle shaft 11A includes two spindle projections 69 located about the rotation axis AX. The two spindle projections 69 are located across the rotation axis AX. In the example described below, for convenience, one of the spindle projections 69 is referred to as a first spindle projection 691, and the other spindle projection 69 is referred to as a second spindle projection 692.

The spindle shaft 11A has a ball groove 70 on its outer circumferential surface. The ball groove 70 is located rearward from the spindle projections 69. The ball groove 70 surrounds the rotation axis AX. The ball groove 70 is recessed radially inward from the outer circumferential surface of the spindle shaft 11A.

The flange 11B is located on a rear portion of the spindle shaft 11A. The flange 11B protrudes radially outward from the rear portion of the spindle shaft 11A. The flange 11B has spindle grooves 71 on its front surface. The spindle grooves 71 (three spindle grooves in the present embodiment) are located circumferentially.

The pin support 11C is located rearward from the flange 11B. The pin support 11C is annular. The flange 11B includes a portion connected to a portion of the pin support 11C with the joint 11D. The raised portion 11E protrudes rearward from the pin support 11C.

The planetary gears 58 are between the flange 11B and the pin support 11C. The pins 59 have the front ends supported by the flange 11B. The pins 59 have the rear ends supported by the pin support 11C. The planetary gears 58 are rotatably supported by each of the flange 11B and the pin support 11C with the pins 59.

The raised portion 11E is received in the spindle bearing 12. The raised portion 11E is rotatably supported by the spindle bearing 12. A washer 74 faces the front end of an inner ring of the spindle bearing 12.

The spindle bearing 12 is located radially inward from the stator 21. The spindle bearing 12 and the stator 21 at least partially overlap each other in the front-rear direction.

The spindle bearing 12 in the embodiment is located radially inward from the front insulator portion 28. The spindle bearing 12 and the front insulator portion 28 at least partially overlap each other in the front-rear direction. The spindle bearing 12 and the coils 29 at least partially overlap each other in the front-rear direction. The spindle bearing 12 is located frontward from the stator core 23. The spindle bearing 12 and the front end of the stator core 23 may overlap each other in the front-rear direction.

The striker 13 is driven by the motor 6. A rotational force from the motor 6 is transmitted to the striker 13 through the reducer 10 and the spindle 11. The striker 13 strikes the movable anvils 17 in the rotation direction in response to the rotational force of the spindle 11 rotated by the motor 6.

The striker 13 includes a hammer 75, a cam ring 76, balls 77, an elastic member 78, a washer 79, and rotation balls 80.

The hammer 75 strikes the movable anvils 17 in the rotation direction. The hammer 75 strikes the tool holding shaft 15 in the rotation direction with the movable anvils 17. The hammer 75 is supported by the spindle 11. The hammer 75 surrounds the spindle shaft 11A. The hammer 75 is rotatably supported by the spindle shaft 11A. The hammer 75 is located frontward from the reducer 10.

The hammer 75 is immovable relative to the hammer case 4 in the axial direction. In actual use, the hammer 75 may move relative to the hammer case 4 slightly in the axial direction in response to, for example, rattling. The hammer 75 rotates relative to the spindle 11. The hammer 75 supported by the spindle shaft 11A rotates relative to the spindle shaft 11A. The hammer 75 strikes the movable anvils 17 in the rotation direction without being axially displaced relative to the spindle 11.

The hammer 75 includes a rear outer cylinder 81, a front outer cylinder 82, and an inner cylinder 83. Each of the rear outer cylinder 81, the front outer cylinder 82, and the inner cylinder 83 surrounds the rotation axis AX. The rear outer cylinder 81, the front outer cylinder 82, and the inner cylinder 83 are integral with one another.

The front outer cylinder 82 is located frontward from the rear outer cylinder 81. The rear outer cylinder 81 has its front end connected to the rear end of the front outer cylinder 82. The rear outer cylinder 81 has a larger outer diameter than the front outer cylinder 82. The rear outer cylinder 81 has a larger inner diameter than the front outer cylinder 82.

The inner cylinder 83 is supported by the spindle shaft 11A. The inner cylinder 83 is located radially inward from the rear outer cylinder 81 and the front outer cylinder 82. The inner cylinder 83 has its front end connected to the rear end of the front outer cylinder 82. The front outer cylinder 82 is located radially outward and frontward from the inner cylinder 83. The rear outer cylinder 81 is located radially outward from the inner cylinder 83 and the front outer cylinder 82, and located rearward from the front outer cylinder 82.

The front outer cylinder 82 has hammer projections 84 on its inner circumferential surface. The hammer projections 84 protrude radially inward from the inner circumferential surface of the front outer cylinder 82. The front outer cylinder 82 has two hammer projections 84 located about the rotation axis AX. The two hammer projections 84 face each other across the rotation axis AX. In the example described below, for convenience, one of the hammer projections 84 is referred to as a first hammer projection 841, and the other hammer projection 84 is referred to as a second hammer projection 842.

The inner cylinder 83 surrounds the spindle shaft 11A. The inner cylinder 83 has its inner circumferential surface facing the outer circumferential surface of the spindle shaft 11A. The inner cylinder 83 has a ball groove 85 on its inner circumferential surface. The ball groove 85 surrounds the rotation axis AX. The ball groove 85 is recessed radially outward from the inner circumferential surface of the inner cylinder 83.

The rear outer cylinder 81 has guide grooves 86 on its inner circumferential surface. The guide grooves 86 extend in the axial direction on the inner circumferential surface of the rear outer cylinder 81. The guide grooves 86 extend frontward from the rear end of the rear outer cylinder 81. The guide grooves 86 (six guide grooves in the present embodiment) are at intervals about the rotation axis AX of the hammer 75. The six guide grooves 86 are located circumferentially at equal intervals.

The cam ring 76 is connected to the flange 11B with the balls 77 in a manner rotatable relative to the flange 11B. The cam ring 76 is connected to the hammer 75 in a manner movable in the axial direction and nonrotatable relative to the hammer 75. The cam ring 76 faces the front surface of the flange 11B. The cam ring 76 is connected to a rear portion of the hammer.

The cam ring 76 is located inside the rear outer cylinder 81. The cam ring 76 and the hammer 75 move relative to each other in the axial direction. As described above, the hammer 75 is immovable relative to the hammer case 4 in the axial direction. In actual use, the hammer 75 may move relative to the hammer case 4 slightly in the axial direction in response to, for example, rattling. The cam ring 76 moves relative to the hammer case 4 in the axial direction in the rear outer cylinder 81 of the hammer 75.

The cam ring 76 includes cam slides 87 on its outer circumferential surface. The cam slides 87 protrude radially outward from the outer circumferential surface of the cam ring 76. The cam slides 87 (six cam slides in the present embodiment) are at intervals about the rotation axis AX of the cam ring 76. The six cam slides 87 are located circumferentially at equal intervals. The cam slides 87 are received in the guide grooves 86. Each cam slide 87 is received in the corresponding guide groove 86. Each cam slide 87 moves in the axial direction along the corresponding guide groove 86. The cam ring 76 moves relative to the hammer 75 in the axial direction, while being guided along the guide grooves 86 receiving the cam slides 87.

Each guide groove 86 guides the cam ring 76 in the axial direction as a guide to restrict the relative rotation between the hammer 75 and the cam ring 76.

The cam ring 76 has cam grooves 88 on its inner circumferential surface. The cam grooves 88 (three cam grooves in the present embodiment) are located circumferentially. The cam ring 76 is located frontward from the flange 11B. The cam ring 76 located inside the rear outer cylinder 81 of the hammer 75 faces the front surface of the flange 11B.

Three balls 77 are between the spindle 11 and the cam ring 76. The balls 77 are between the flange 11B and the cam ring 76. The flange 11B and the cam ring 76 rotate relative to each other with the balls 77 in between.

The balls 77 are formed from a metal such as steel. The flange 11B has the three spindle grooves 71 receiving at least parts of the balls 77. The flange 11B has the spindle grooves 71 on a part of its front surface. The spindle grooves 71 are arc-shaped in a plane perpendicular to the rotation axis AX. The cam ring 76 has the three cam grooves 88 receiving at least parts of the balls 77. The cam ring 76 has the cam grooves 88 on portions of its inner circumferential surface. The cam grooves 88 are arc-shaped in a plane perpendicular to the rotation axis AX. The balls 77 are between the spindle grooves 71 and the cam grooves 88. Each ball 77 is between the corresponding spindle groove 71 and the corresponding cam groove 88. Each ball 77 rolls inside the corresponding groove 71 and inside the corresponding cam groove 88. The cam ring 76 is movable together with the balls 77.

The spindle grooves 71 are at least partially inclined rearward in the first circumferential direction. The spindle grooves 71 may be at least partially inclined rearward in the second circumferential direction.

The cam grooves 88 are at least partially inclined rearward in the first circumferential direction. The cam grooves 88 may be at least partially inclined rearward in the second circumferential direction.

In the relative rotation between the flange 11B and the cam ring 76, each ball 77 moves between the corresponding spindle groove 71 and the corresponding cam groove 88 from the center toward the end in the first circumferential direction of the corresponding spindle groove 71. This causes the cam ring 76 to move forward under a force from the balls 77.

In the relative rotation between the flange 11B and the cam ring 76, each ball 77 also moves between the corresponding spindle groove 71 and the corresponding cam groove 88 from the end in the first circumferential direction toward the center of the corresponding spindle groove 71. This causes the cam ring 76 to move backward under a force from the balls 77.

In the relative rotation between the flange 11B and the cam ring 76, each ball 77 moves between the corresponding spindle groove 71 and the corresponding cam groove 88 from the center toward the end in the second circumferential direction of the corresponding spindle groove 71. This causes the cam ring 76 to move forward under a force from the balls 77.

In the relative rotation between the flange 11B and the cam ring 76, each ball 77 also moves between the corresponding spindle groove 71 and the corresponding cam groove 88 from the end in the second circumferential direction toward the center of the corresponding spindle groove 71. This causes the cam ring 76 to move backward under a force from the balls 77.

The flange 11B and the cam ring 76 move relative to each other in the axial direction and in the rotation direction within a movable range defined by the spindle grooves 71 and the cam grooves 88.

The cam ring 76 is connected to the flange 11B with the balls 77. The cam ring 76 rotates together with the spindle 11 in response to a rotational force of the spindle 11 rotated by the motor 6. The cam ring 76 rotates about the rotation axis AX.

The elastic member 78 constantly generates an elastic force for moving the cam ring 76 backward. The elastic member 78 is between the hammer 75 and the cam ring 76 in the axial direction. The elastic member 78 at least partially surrounds the spindle shaft 11A. The hammer 75 in the embodiment has a recess 89 recessed frontward from the rear surface of the hammer 75. The recess 89 is defined by the inner circumferential surface of the rear outer cylinder 81, the outer circumferential surface of the inner cylinder 83, and a support surface 90. The support surface 90 is located frontward from the flange 11B and the cam ring 76. The support surface 90 connects the front end of the inner circumferential surface of the rear outer cylinder 81 with the front end of the outer circumferential surface of the inner cylinder 83. The support surface 90 is annular. The elastic member 78 is at least partially received in the recess 89. The elastic member 78 is between the front surface of the cam ring 76 and the support surface 90 in the axial direction.

The elastic member 78 in the embodiment includes a rear portion surrounding the spindle shaft 11A. The elastic member 78 includes a front portion surrounding the inner cylinder 83 inside the recess 89. The elastic member 78 in the embodiment includes multiple disc springs 91. The disc springs 91 (four disc springs in the present embodiment) are located in the axial direction. The disc springs 91 are annular. In the embodiment, the disc springs 91 include disc springs 91 surrounding the spindle shaft 11A and disc springs 91 surrounding the inner cylinder 83.

The hammer 75 surrounds the spindle shaft 11A. The cam ring 76 is located frontward from the flange 11B. The cam ring 76 is connected to the flange 11B with the balls 77. The cam ring 76 is connected to the rear portion of the hammer 75 with the cam slides 87 and the guide grooves 86. A closed space is defined by the spindle shaft 11A, the hammer 75, and the cam ring 76. The closed space is defined by the outer circumferential surface of the spindle shaft 11A, the outer circumferential surface of the inner cylinder 83, the support surface 90, the inner circumferential surface of the rear outer cylinder 81, and the front surface of the cam ring 76. The elastic member 78 is located in the closed space.

The washer 79 supports the front end of the elastic member 78. The washer 79 is located radially outward from the inner cylinder 83. The washer 79 is annular. The washer 79 surrounds the inner cylinder 83. The washer 79 is received in the recess 89. The washer 79 is supported by at least a part of the hammer 75 in the recess 89.

The elastic member 78 has the rear end in contact with the front surface of the cam ring 76. The front end of the elastic member 78 is in contact with the washer 79. The front end of the elastic member 78 is connected to the hammer 75 with the washer 79. In the embodiment, the rear end of the elastic member 78 refers to the rear end of the rearmost one of the multiple disc springs 91. The front end of the elastic member 78 refers to the front end of the frontmost one of the multiple disc springs 91.

The rotation balls 80 are between the spindle shaft 11A and the hammer 75. The rotation balls 80 are between the ball groove 70 and the ball groove 85. The rotation balls 80 include rotation balls 80 received in the ball groove 70 and rotation balls 80 received in the ball groove 85. The rotation balls 80 surround the rotation axis AX of the spindle 11. As described above, the hammer 75 rotates relative to the spindle shaft 11A. The rotation balls 80 serve as a bearing for the hammer 75. The rotation balls 80 allow the hammer 75 to rotate smoothly relative to the spindle shaft 11A.

The structure according to the embodiment includes screws 93 for adjusting an elastic force of the elastic member 78 in an initial state before the motor 6 is activated. The screws 93 are used to adjust the amount of compression of the elastic member 78 in the initial state to adjust the elastic force of the elastic member 78.

The elastic member 78 has its rear end supported by the flange 11B with the cam ring 76 in between. The screws 93 are used to change the position of the front end of the elastic member 78 to adjust the amount of compression of the elastic member 78.

The screws 93 are in contact with the washer 79. The screws 93 are connected to the front end of the elastic member 78 with the washer 79. The screws 93 are received in threaded holes 94 in the hammer 75. The threaded holes 94 extend through a front end face 95 of the rear outer cylinder 81 and the support surface 90. The front end face 95 is annular in the plane perpendicular to the rotation axis AX. The front end face 95 faces frontward. The threaded holes 94 (six threaded holes in the present embodiment) are at intervals about the rotation axis AX of the hammer 75. Each threaded hole 94 receives the corresponding screw 93.

The screws 93 have their rear ends in contact with the front surface of the washer 79. The screws 93 are rotated to adjust the amount of compression of the elastic member 78. The screws 93 rotating in one direction move backward relative to the hammer 75. This causes the front end of the elastic member 78 to move backward with the washer 79. With the rear end of the elastic member 78 supported by the flange 11B with the cam ring 76 in between, the front end of the elastic member 78 moves backward to compress the elastic member 78. The screws 93 rotating in the other direction move forward relative to the hammer 75. With the rear end of the elastic member 78 supported by the flange 11B with the cam ring 76 in between, the front end of the elastic member 78 moves forward to extend the elastic member 78.

The amount of compression of the elastic member 78 is adjusted in the assembly of the electric work machine 1. The spindle 11, the hammer 75, and the cam ring 76 are connected to one another with the elastic member 78 placed in the closed space defined by the spindle shaft 11A, the hammer 75, and the cam ring 76. A screwing tool is then inserted into the threaded holes 94 from the front of the front end face 95. The tip end of the screwing tool is placed into the screw drive of each screw 93 through the corresponding threaded hole 94. An assembler adjusts the amount of compression of the elastic member 78 by rotating the screws 93 with the screwing tool. The angle of inclination of the elastic member 78 relative to the spindle 11 is adjusted by adjusting the axial position of each screw 93.

The hammer bearing 14 supports the hammer 75 in a rotatable manner. The hammer bearing 14 is held in the hammer case 4. The hammer bearing 14 surrounds the hammer 75. The hammer bearing 14 in the embodiment supports the front end of the hammer 75 in a rotatable manner. The hammer bearing 14 in the embodiment surrounds the front outer cylinder 82. The hammer bearing 14 has its rear end at least partially in contact with the front end face 95 of the rear outer cylinder 81. The hammer case 4 has a facing surface 96 facing the front end of the hammer bearing 14. The facing surface 96 faces rearward. The front end of the hammer bearing 14 and the facing surface 96 of the hammer case 4 face each other with a clearance in between. The hammer bearing 14 is a ball bearing. The hammer bearing 14 includes an outer ring in contact with the inner circumferential surface of the large cylindrical portion 4A in the hammer case 4. The hammer bearing 14 includes an inner ring in contact with the outer circumferential surface of the front outer cylinder 82 in the hammer 75.

The hammer bearing 14 in the embodiment covers the front ends of the threaded holes 94. In the assembly of the electric work machine 1, the screws 93 are rotated with a screwing tool to adjust the amount of compression of the elastic member 78. The hammer bearing 14 is then placed to surround the front outer cylinder 82.

The tool holding shaft 15 is an output unit of the electric work machine 1 that rotates in response to a rotational force from the rotor 22. The tool holding shaft 15 is at least partially located frontward from the spindle 11. The tool holding shaft 15 includes a tool holding portion 97 and an anvil 98. The anvil 98 is located rearward from the tool holding portion 97. The tool holding portion 97 is a rod extending in the front-rear direction. The anvil 98 is connected to a rear portion of the tool holding portion 97.

The tool holding portion 97 holds a tip tool. The tool holding portion 97 has a tool hole 99 to receive the tip tool. The tool hole 99 extends rearward from the front end face of tool holding portion 97. The tip tool is attached to the tool holding shaft 15.

The anvil 98 is located rearward from the tool holding portion 97. The anvil 98 is connected to the rear portion of the tool holding portion 97. The anvil 98 surrounds the rotation axis AX. The anvil 98 has a recess 100 receiving the front end of the spindle shaft 11A. The front end of the spindle shaft 11A including the spindle projections 69 is received in the recess 100. The recess 100 is recessed frontward from the rear end face of the anvil 98.

The anvil 98 has anvil holes 104. The anvil holes 104 extend through an outer circumferential surface 103 and an inner circumferential surface 101 of the anvil 98. The anvil holes 104 extend in the radial direction. The anvil 98 has two anvil holes 104 located about the rotation axis AX. The two anvil holes 104 are located across the rotation axis AX.

In the embodiment, the front end of the spindle shaft 11A supports a support ball 106. The spindle shaft 11A has a support recess 105 on its front end face. The support recess 105 has a semispherical inner surface. The support ball 106 is received in the support recess 105. The support ball 106 is in contact with a rearward facing surface of the inner surface of the recess 100.

The tool holding shaft 15 is rotatably supported by the shaft bearings 16. The shaft bearings 16 surround the tool holding portion 97. The shaft bearings 16 are located inside the small cylindrical portion 4B of the hammer case 4. The shaft bearings 16 are held in the small cylindrical portion 4B of the hammer case 4. The shaft bearings 16 support a front portion of the tool holding portion 97 in a rotatable manner. In the embodiment, two shaft bearings 16 are located in the axial direction. An O-ring 107 is between each shaft bearing 16 and the tool holding portion 97.

A stopper 108 is located rearward from the shaft bearings 16. The stopper 108 reduces slipping of the shaft bearings 16 rearward. The stopper 108 is received in a groove on the inner circumferential surface of the small cylindrical portion 4B. Examples of the stopper 108 include a snap ring or a C-ring. The stopper 108 is in contact with the rear end face of the shaft bearings 16. The stopper 108 reduces slipping of the shaft bearings 16 rearward from the small cylindrical portion 4B.

The movable anvils 17 are movably supported by the tool holding shaft 15. The movable anvils 17 in the present embodiment move in the radial direction alone relative to the tool holding shaft 15. The movable anvils 17 are immovable in the axial and radial directions relative to the tool holding shaft 15.

The movable anvils 17 are movably supported by the anvil 98. The movable anvils 17 are received in the anvil holes 104. The movable anvils 17 are received in the respective two anvil holes 104. The movable anvils 17 are cylindrical (pin-shaped). The movable anvils 17 are received in the respective anvil holes 104 to have the central axis of each movable anvil 17 parallel to the rotation axis AX of the tool holding shaft 15. In the example described below, for convenience, one of the movable anvils 17 is referred to as a first movable anvil 171, and the other movable anvil 17 is referred to as a second movable anvil 172.

Each movable anvil 17 moves radially while being guided by the corresponding anvil hole 104. Each anvil hole 104 has its inner surface serving as a guide surface for radially guiding the corresponding movable anvil 17. The recess 100 on the anvil 98 receives the front end of the spindle shaft 11A. The spindle projections 69 are located at the front end of the spindle shaft 11A. In response to the spindle projections 69 coming in contact with the movable anvils 17, the movable anvils 17 move radially outward. In response to the spindle projections 69 being apart from the movable anvils 17, the movable anvils 17 move radially inward.

The movable anvils 17 move to switch between a first state and a second state. In the first state, the movable anvils 17 at least partially protrude radially outward from the outer circumferential surface 103 of the anvil 98. In the second state, the movable anvils 17 are located radially inward from the outer circumferential surface 103 of the anvil 98. When the spindle 11 rotates, the movable anvils 17 come in contact with the spindle projections 69 to change from the second state to the first state. In other words, when the spindle projections 69 come in contact with the movable anvils 17, the movable anvils 17 are at least partially located radially outward from the outer circumferential surface 103 of the anvil 98.

When the movable anvils 17 are in the first state, the hammer projections 84 can be in contact with the movable anvils 17. The hammer 75 strikes the movable anvils 17 in the first state. When the movable anvils 17 are in the second state, the hammer projections 84 cannot be in contact with the movable anvils 17. The hammer 75 rotates about the spindle shaft 11A when the movable anvils 17 are in the second state.

The tool holder 18 is located frontward from the hammer case 4 and surrounds the tool holding portion 97. The tool holder 18 holds the tip tool received in the tool hole 99 in the tool holding portion 97. The tool holder 18 is attachable to and detachable from the tip tool. The tool holder 18 includes holding balls 110, a leaf spring 111, a sleeve 112, a coil spring 113, and a positioner 114.

The tool holding portion 97 has support recesses 115 to support the holding balls 110. The tool holding portion 97 has two support recesses 115 on its outer surface.

The holding balls 110 are movably supported by the tool holding portion 97. The holding balls 110 are received in the support recesses 115. Each holding ball 110 is received in the corresponding support recess 115.

The tool holding portion 97 has a through-hole connecting the inner surface of each support recess 115 and the inner surface of the tool hole 99. Each holding ball 110 has a smaller diameter than an innermost diameter of the through-hole in the radial direction. Each holding ball 110 supported by the corresponding support recess 115 is at least partially received in the tool hole 99. The holding balls 110 fasten the tip tool received in the tool hole 99. Each holding ball 110 is movable between an engagement position and a release position. At the engagement position, the holding balls 110 fasten the tip tool. At the release position, the holding balls 110 unfasten the tip tool.

The leaf spring 111 generates an elastic force for moving the holding balls 110 to the engagement positions. The leaf spring 111 surrounds the tool holding portion 97. The leaf spring 111 generates an elastic force for moving the holding balls 110 forward.

The sleeve 112 is cylindrical. The sleeve 112 surrounds the tool holding portion 97. The sleeve 112 is movable about the tool holding portion 97 in the axial direction. The sleeve 112 restricts the holding balls 110 at the engagement positions from moving out of the engagement positions. The sleeve 112 moves in the axial direction to permit the holding balls 110 to move from the engagement positions to the release positions.

The sleeve 112 is movable about the tool holding portion 97 between a movement-restricting position and a movement-permitting position. At the movement-restricting position, the sleeve 112 restricts the holding balls 110 from moving radially outward. At the movement-permitting position, the sleeve 112 permits the holding balls 110 to move radially outward.

The sleeve 112 at the movement-restricting position restricts the holding balls 110 at the engagement positions from moving radially outward. In other words, with the sleeve 112 at the movement-restricting position, the holding balls 110 at the engagement positions are restricted from moving out of the engagement positions. Thus, the tip tool remains fastened by the holding balls 110.

The sleeve 112 moved to the movement-permitting position permits the holding balls 110 at the engagement positions to move radially outward. With the sleeve 112 moved to the movement-permitting position, the holding balls 110 at the engagement positions are movable to the release positions. In other words, with the sleeve 112 at the movement-permitting position, the holding balls 110 at the engagement positions are permitted to move out of the engagement positions. This causes the tip tool fastened by the holding balls 110 to be unfastened.

The coil spring 113 generates an elastic force for moving the sleeve 112 to the movement-restricting position. The coil spring 113 surrounds the tool holding portion 97. The movement-restricting position is defined rearward from the movement-permitting position. The coil spring 113 generates an elastic force for moving the sleeve 112 backward.

The positioner 114 is annular and is fixed on the outer surface of the tool holding portion 97. The positioner 114 is fixed to face the rear end of the sleeve 112. The positioner 114 positions the sleeve 112 at the movement-restricting position. The sleeve 112 under an elastic force from the coil spring 113 for moving backward comes in contact with the positioner 114 and is positioned at the movement-restricting position.

Operation of Electric Work Machine

The operation of the electric work machine 1 will now be described. Each of FIGS. 14 to 23 is a sectional view of the electric work machine 1 according to the present embodiment, showing its operation. Each of FIGS. 14, 16, 18, 20, and 22 is a sectional view taken along a plane including the movable anvils 17. Each of FIGS. 15, 17, 19, 21, and 23 is a sectional view taken along a plane including the cam ring 76.

The spindle projections 69 in the embodiment include the first spindle projection 691 and the second spindle projection 692. The hammer projections 84 include the first hammer projection 841 and the second hammer projection 842. The movable anvils 17 include the first movable anvil 171 and the second movable anvil 172.

To perform a screwing operation on a workpiece, a tip tool (screwdriver bit) for the screwing operation is placed into the tool hole 99 in the tool holding shaft 15. The tip tool in the tool hole 99 is held by the tool holder 18.

In the screwing operation, the operator operates a forward-reverse switch lever 41 (refer to FIGS. 1 and 2) to rotate the tool holding shaft 15 in a forward direction. This can switch the rotation direction of the motor 6 between forward and reverse. This operation switches the rotation direction of the spindle 11.

With the tip tool attached to the tool holding shaft 15, the operator grips the grip 2B with, for example, the right hand and pulls a trigger lever 40 (refer to FIGS. 1 and 2) with the right index finger. Thus, power is fed from the battery pack 19 to the motor 6 to activate the motor 6. This rotates the rotor shaft 33 in the rotor 22. A rotational force of the rotor shaft 33 is then transmitted to the planetary gears 58 through the pinion gear 48. The planetary gears 58 revolve about the pinion gear 48 while rotating and meshing with the internal teeth on the internal gear 60. The planetary gears 58 are rotatably supported by the spindle 11 with the pins. The revolving planetary gears 58 rotate the spindle 11 at a lower rotational speed than the rotor shaft 33.

Figure 14:
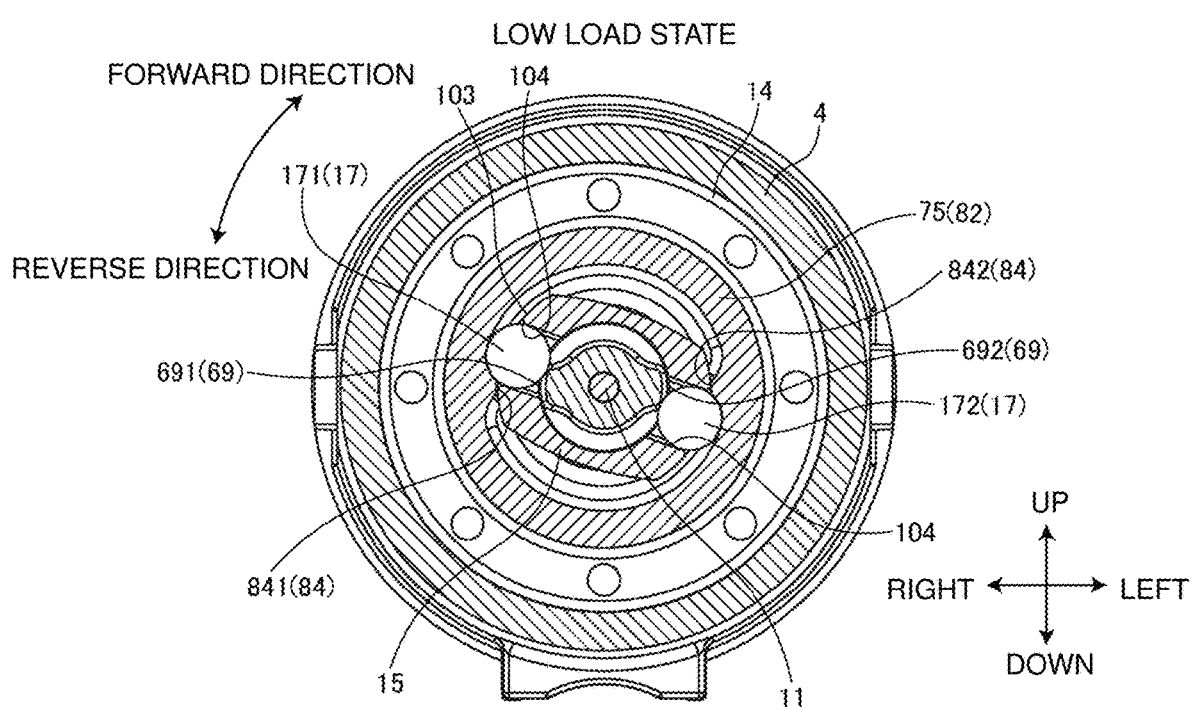
FIG. 14 is a sectional view of the electric work machine according to the embodiment, showing its operation.
Figure 15:
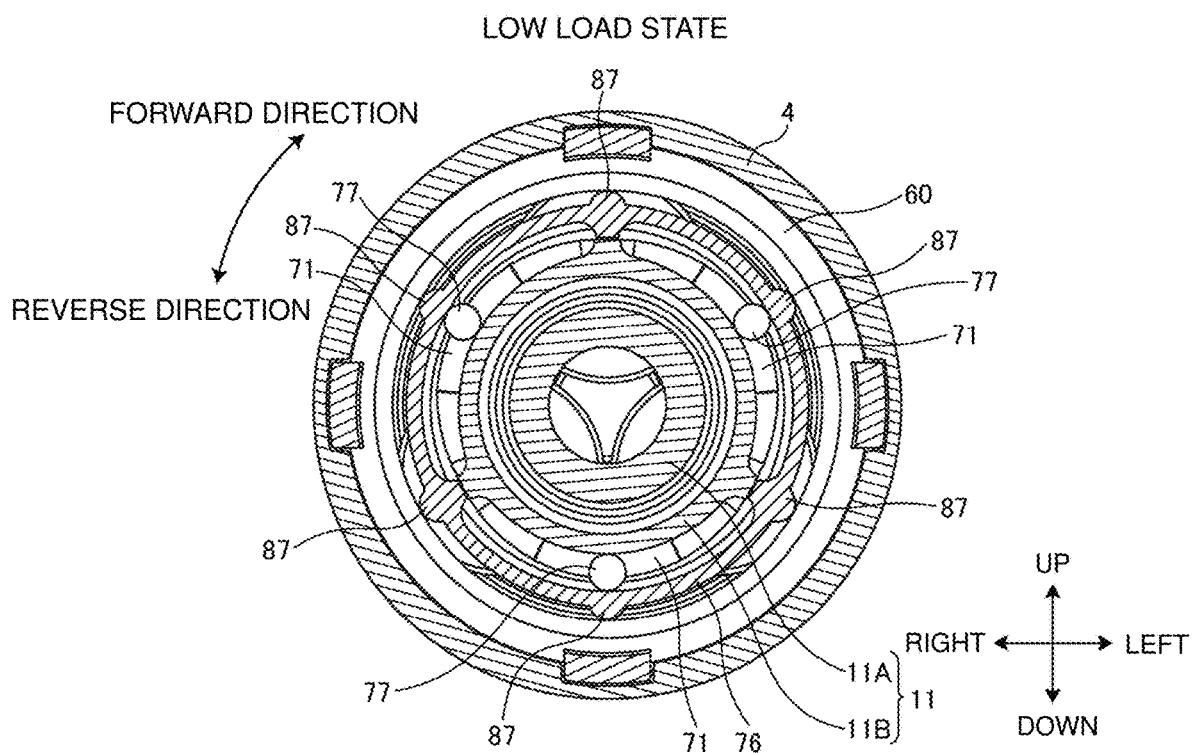
FIG. 15 is a sectional view of an electric work machine according to a first embodiment, showing its operation.

Each of FIGS. 14 and 15 is a sectional view of the electric work machine 1 in a low load state in which the tool holding shaft 15 rotates under a low load.

As shown in FIG. 14, in the low load state, the spindle projections 69 are in contact with the movable anvils 17, and the movable anvils 17 are in contact with the hammer projections 84. The spindle projections 69 are also in contact with the movable anvils 17, and the movable anvils 17 are in contact with the hammer projections 84.

In the low load state, the movable anvils 17 in contact with the spindle projections 69 move radially outward. The movable anvils 17 are at least partially located radially outward from the outer circumferential surface of the anvil 98. Thus, in the low load state, the hammer projections 84 are in contact with at least parts of the movable anvils 17.

In the low load state, the movable anvils 17 producing a wedge effect cannot move through between the spindle projections 69 and the hammer projections 84. This restricts relative rotation between the spindle 11, the hammer 75, and the tool holding shaft 15. The tool holding shaft 15 rotates together with the hammer 75 and the spindle 11 with the movable anvils 17 in between.

The cam ring 76 is connected to the hammer 75 with the cam slides 87 and the guide grooves 86. The cam ring 76 is pressed against the flange 11B under the elastic force from the elastic member 78. Thus, in the low load state in which the hammer 75 and the spindle 11 are nonrotatable relative to each other, the cam ring 76 rotates together with the spindle 11 and the hammer 75. In other words, in the low load state, the spindle 11, the hammer 75, the tool holding shaft 15, and the cam ring 76 rotate together.

As shown in FIG. 15, in the low load state, with each ball 77 in the middle of the corresponding spindle groove 71, the cam ring 76 and the spindle 11 rotate together. In the low load state, the cam ring 76 is at the rear end of the rear outer cylinder 81 in the hammer 75 in the axial direction.

Figure 16:
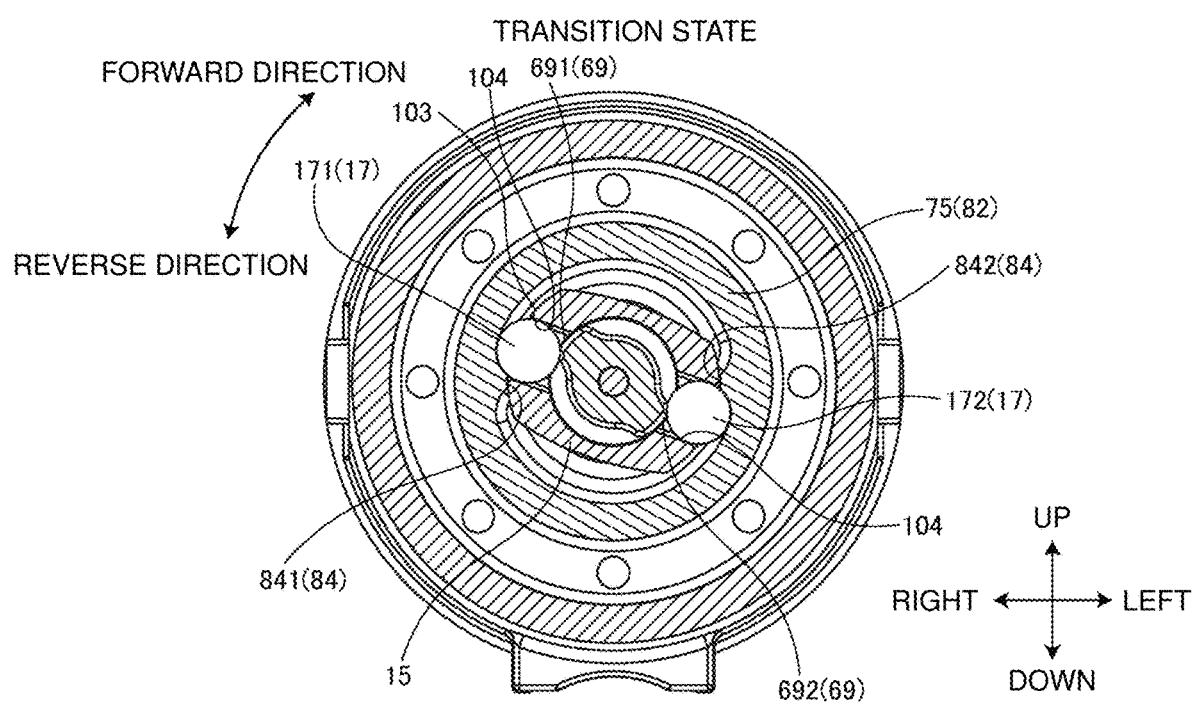
FIG. 16 is a sectional view the electric work machine according to the first embodiment, showing its operation.
Figure 17:
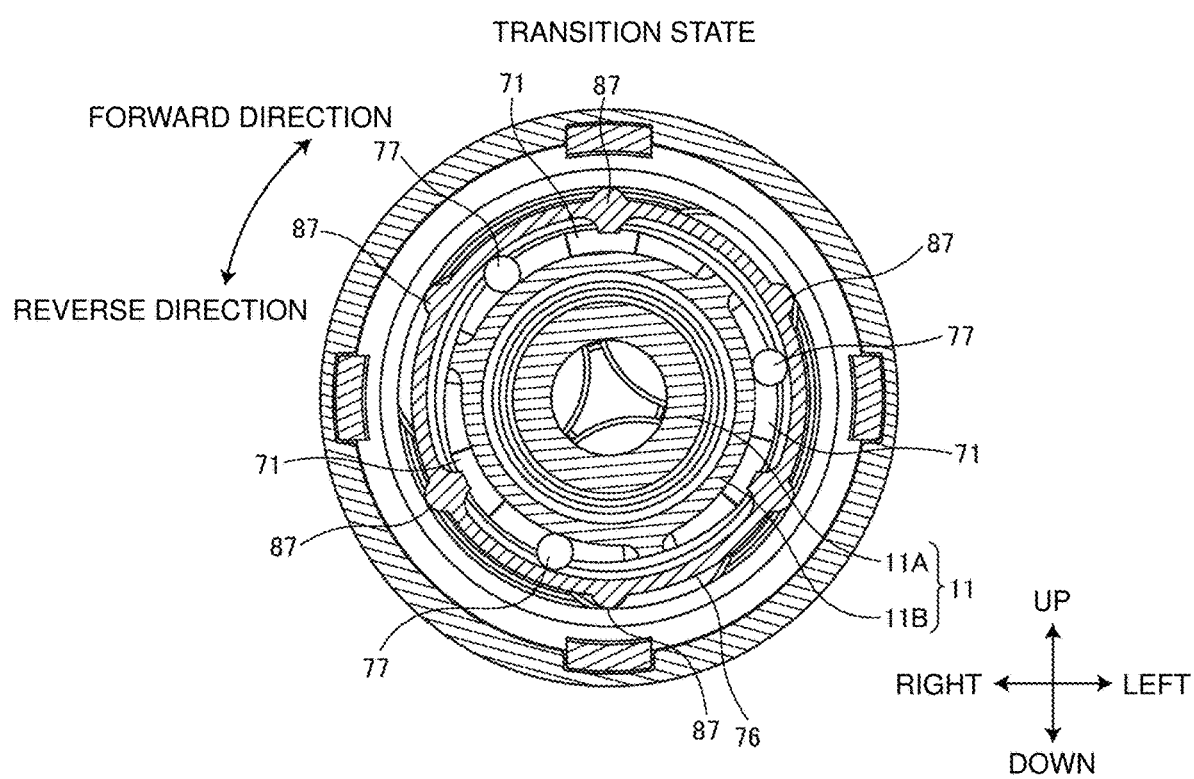
FIG. 17 is a sectional view of the electric work machine according to the first embodiment, showing its operation.

Each of FIGS. 16 and 17 is a sectional view of the electric work machine 1 in a transition state immediately after the tool holding shaft 15 under a low load starts receiving a high load.

As the screwing operation proceeds, the tool holding shaft 15 receives a higher load, decreasing the rotational speed of the tool holding shaft 15. As the rotational speed of the tool holding shaft 15 decreases, the rotational speed of the hammer 75 connected to the tool holding shaft 15 with the movable anvils 17 also decreases. As the rotational speed of the hammer 75 decreases, the rotational speed of the cam ring 76 connected to the hammer 75 with the guide grooves 86 and the cam slides 87 also decreases. In contrast, the rotational speed of the spindle 11 that rotates under the rotational force from the motor 6 remains unchanged.

Although the rotational speed of the spindle 11 remains unchanged, the rotational speeds of the tool holding shaft 15, the hammer 75, and the cam ring 76 decrease to cause the tool holding shaft 15, the hammer 75, and the cam ring 76 to start rotating relative to the spindle 11. The tool holding shaft 15, the hammer 75, and the cam ring 76 rotate together.

As shown in FIG. 16, in the transition from the low load state to a high load state, the tool holding shaft 15 and the hammer 75 rotate relative to the spindle 11 to cause the spindle projections 69 to be apart from the movable anvils 17.

As the rotational speed of the hammer 75 decreases, the rotational speed of the cam ring 76 connected to the hammer 75 with the guide grooves 86 and the cam slides 87 also decreases. When the spindle 11 continues to rotate without any decrease in its rotational speed, each ball 77 moves in the corresponding spindle groove 71 and the corresponding cam groove 88 with the cam ring 76 rotating at the decreased rotational speed.

As shown in FIG. 17, in the transition from the low load state to the high load state, each ball 77 in the middle moves toward an end of the corresponding spindle groove 71. This causes the cam ring 76 to move forward under the force from the balls 77. The cam ring 76 moves forward while being guided by the guide grooves 86. The cam ring 76 moves forward against the elastic force from the elastic member 78.

With the flange 11B and the cam ring 76 rotating together in the forward direction, each ball 77 in the middle moves toward the end in the second circumferential direction of the corresponding spindle groove 71 when the tool holding shaft 15 transitions from the low load state to the high load state and causes the decreased rotational speed of the cam ring 76 and the relative rotation between the cam ring 76 and the flange 11B. This causes the cam ring 76 to move forward under the force from the balls 77.

Figure 18:
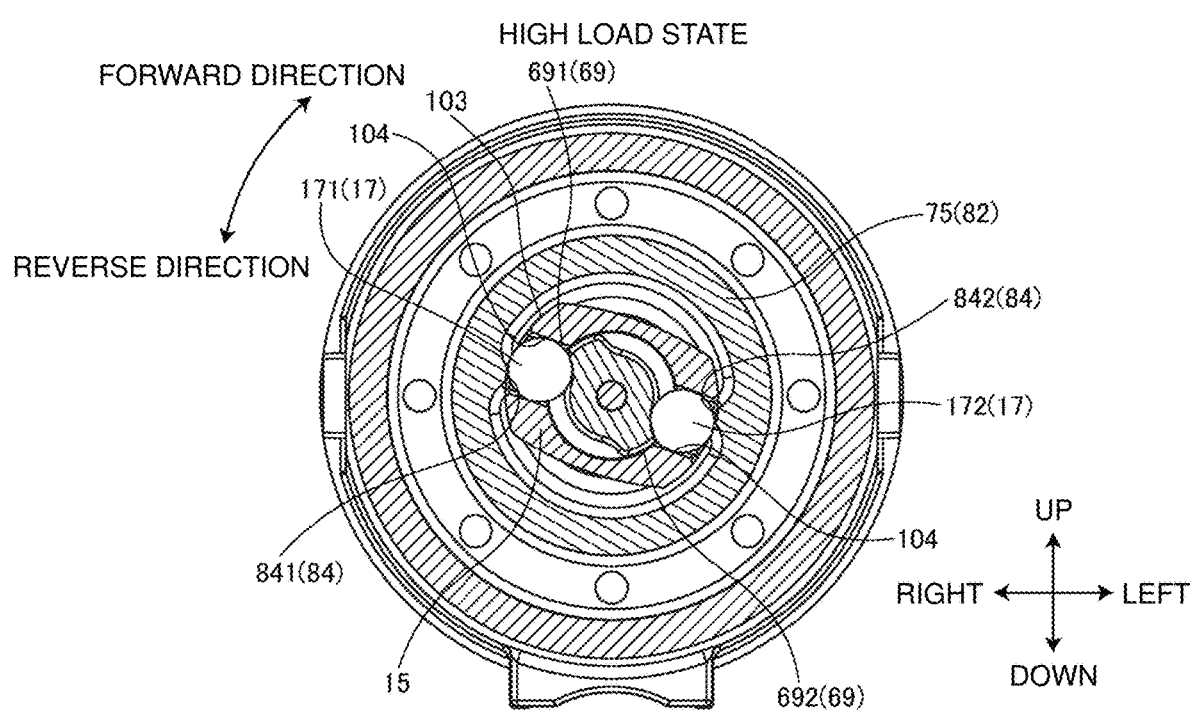
FIG. 18 is a sectional view of the electric work machine according to the first embodiment, showing its operation.
Figure 19:
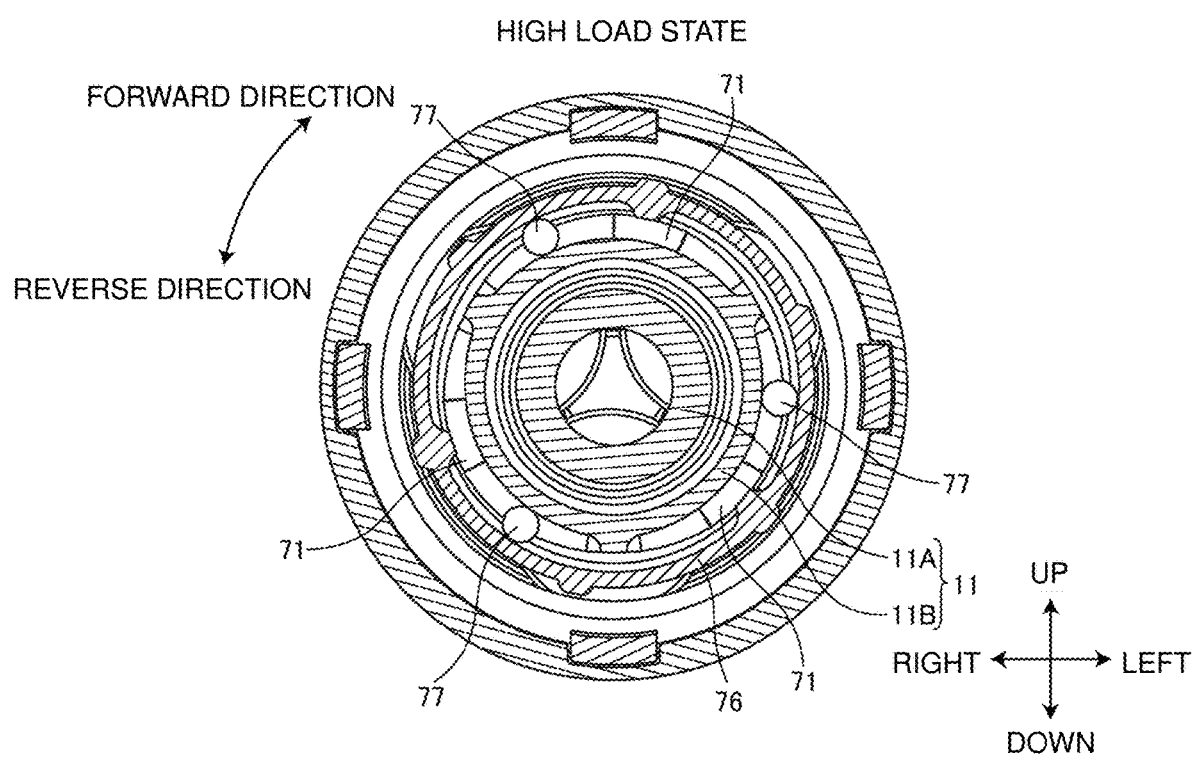
FIG. 19 is a sectional view of the electric work machine according to the first embodiment, showing its operation.

Each of FIGS. 18 and 19 is a sectional view of the electric work machine 1 in the high load state at a predetermined time after the transition from the low load state to the high load state.

As the high load state continues, the tool holding shaft 15, the hammer 75, and the cam ring 76 stop rotating. In contrast, the spindle 11 continues to rotate under the rotational force from the motor 6.

With the tool holding shaft 15 in the high load state, the spindle 11 continues to rotate, whereas each of the tool holding shaft 15, the hammer 75, and the cam ring 76 stops rotating. The cam ring 76 under the force from the balls 77 moves forward against the elastic force from the elastic member 78.

As shown in FIG. 18, when each of the tool holding shaft 15, the hammer 75, and the cam ring 76 stops rotating, the spindle 11 continues to rotate and causes the spindle projections 69 to be further apart from the movable anvils 17 in the rotation direction. This allows the movable anvils 17 to move radially inward. The movable anvils 17 moving radially inward from the outer circumferential surface 103 of the anvil 98 cause the hammer projections 84 to be apart from the movable anvils 17. In other words, the movable anvils 17 unlock the hammer 75 and allow the hammer 75 to rotate relative to the spindle 11.

Unlocking of the hammer 75 also allows the cam ring 76 to rotate relative to the spindle 11. The cam ring 76 moves backward from the hammer 75 under the elastic force from the elastic member 78. The cam ring 76 moves backward while being guided along the guide grooves 86. The cam ring 76 rotatable relative to the spindle 11 moves backward to rotate in the forward direction under the force from the balls 77. In other words, the cam ring 76 rotates in the forward direction while moving backward. Each ball 77 moves from the end to the middle of the corresponding spindle groove 71. The hammer 75 is connected to the cam ring 76 with the cam slides 87 and the guide grooves 86. As the cam ring 76 rotates in the forward direction, the hammer 75 also rotates in the forward direction.

After the hammer 75 is unlocked, with the cam ring 76 under the elastic force from the elastic member 78 moving backward, each ball 77 moves from the end in the second circumferential direction of the corresponding spindle groove 71 to the middle of the corresponding spindle groove 71. This causes the cam ring 76 to move backward under the force from the balls 77, while rotating relative to the flange 11B.

Figure 20:
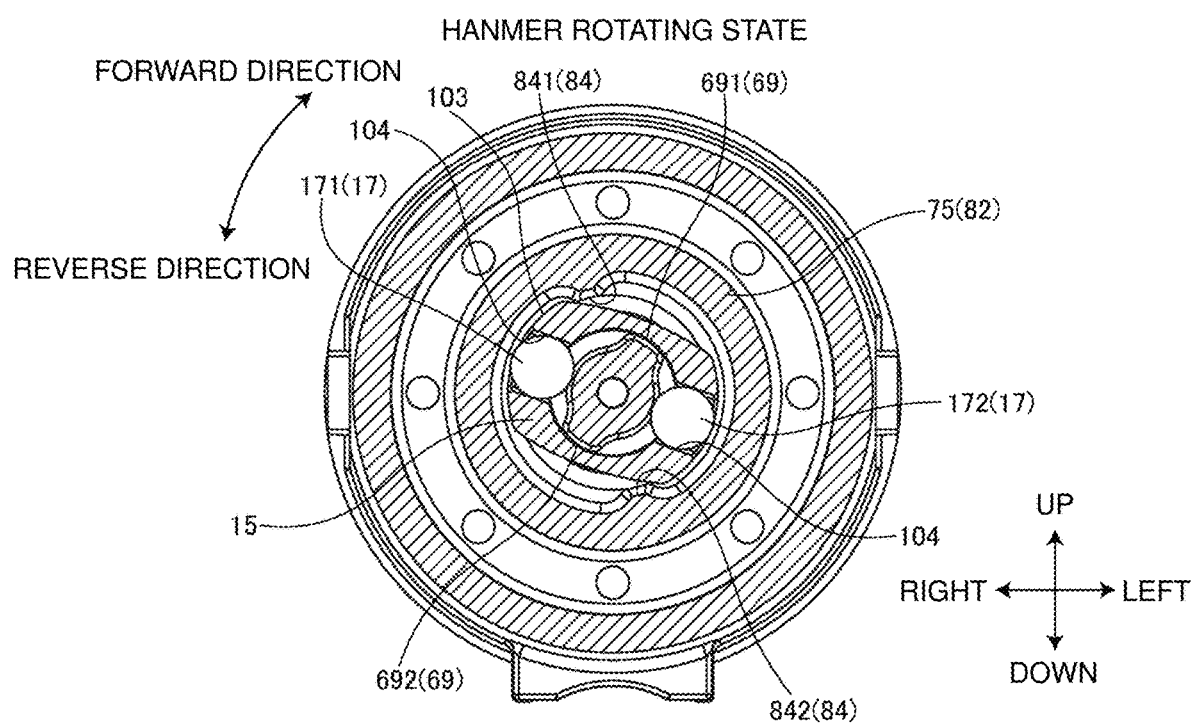
FIG. 20 is a sectional view of the electric work machine according to the first embodiment, showing its operation.
Figure 21:
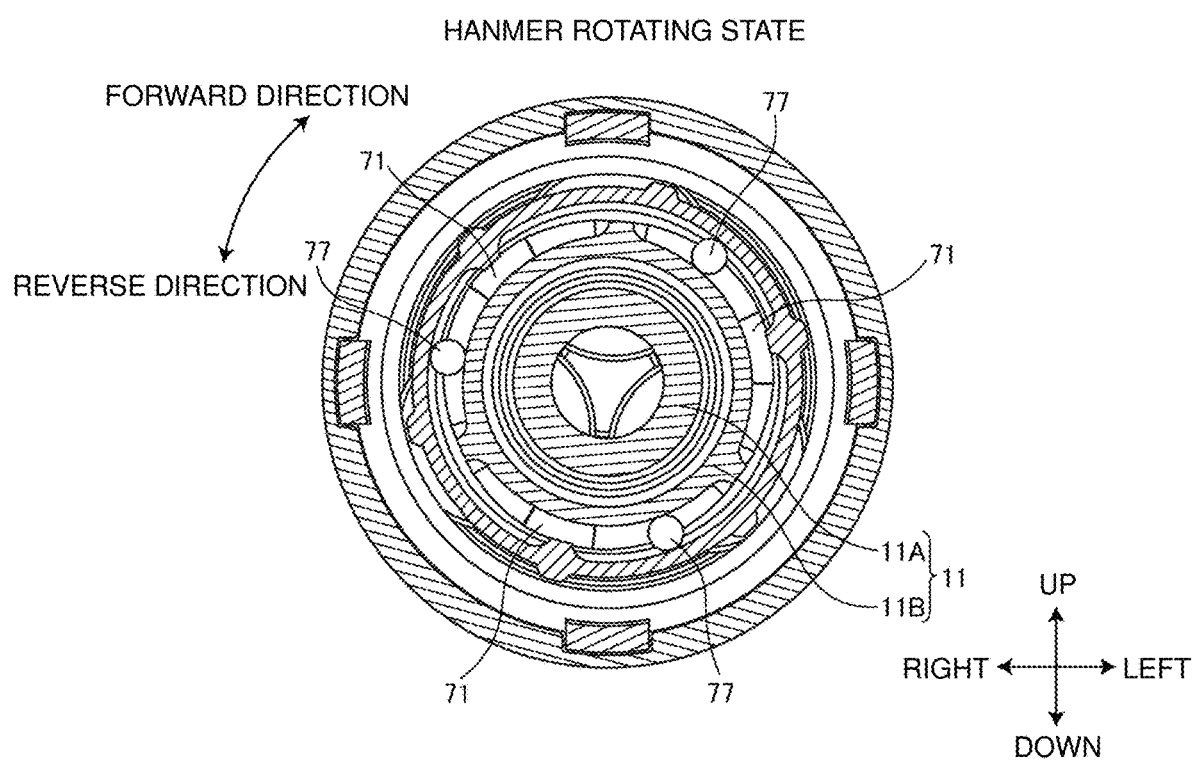
FIG. 21 is a sectional view of the electric work machine according to the first embodiment, showing its operation.

Each of FIGS. 20 and 21 is a sectional view of the electric work machine 1 in a hammer rotating state in which the hammer 75 rotates to strike the movable anvils 17.

As shown in FIG. 20, when the hammer 75 rotates, the spindle 11 rotates in the forward direction under the rotational force from the motor 6. The hammer 75 rotates in the forward direction together with the cam ring 76 that rotates under the elastic force from the elastic member 78. The spindle 11 rotates to cause the first spindle projection 691 apart from the first movable anvil 171 to move toward the second movable anvil 172 and cause the second spindle projection 692 apart from the second movable anvil 172 to move toward the first movable anvil 171. The hammer 75 rotates to cause the first hammer projection 841 apart from the first movable anvil 171 to move toward the second movable anvil 172 and cause the second hammer projection 842 apart from the second movable anvil 172 to move toward the first movable anvil 171.

The first hammer projection 841 turns about the spindle 11 in the forward direction to follow the first spindle projection 691. The first spindle projection 691 reaches the second movable anvil 172 before the first hammer projection 841 reaches the second movable anvil 172. The second hammer projection 842 turns about the spindle 11 in the forward direction to follow the second spindle projection 692. The second spindle projection 692 reaches the first movable anvil 171 before the second hammer projection 842 reaches the first movable anvil 171.

Figure 22:
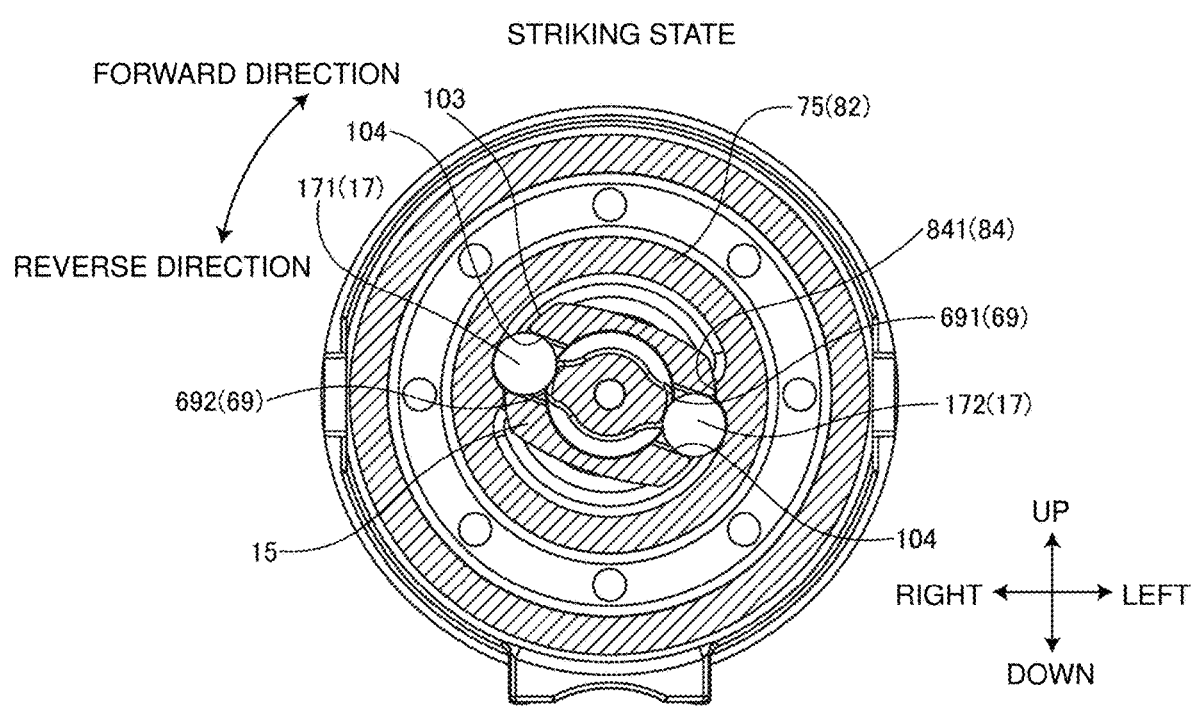
FIG. 22 is a sectional view of the electric work machine according to the first embodiment, showing its operation.
Figure 23:
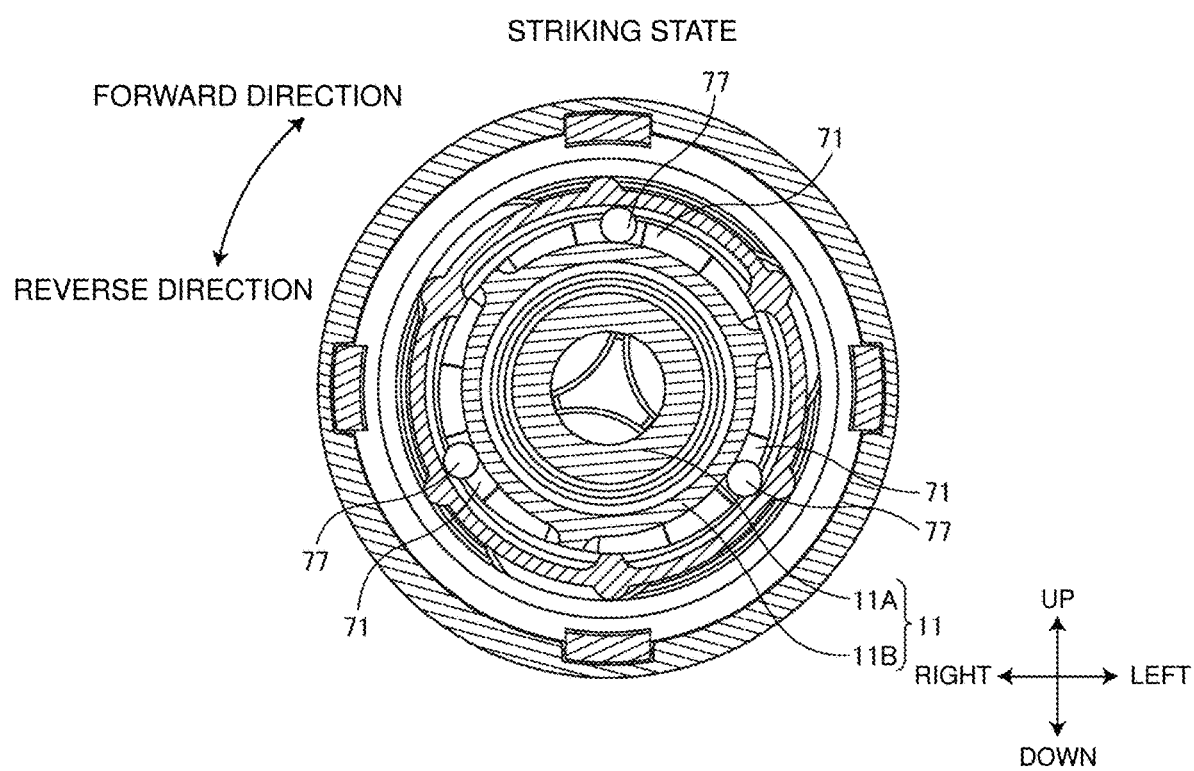
FIG. 23 is a sectional view of the electric work machine according to the first embodiment, showing its operation.

Each of FIGS. 22 and 23 is a sectional view of the electric work machine 1 in a striking state in which the hammer 75 strikes the movable anvils 17.

As described above, the first spindle projection 691 reaches the second movable anvil 172 before the first hammer projection 841 reaches the second movable anvil 172. The first spindle projection 691 comes in contact with the second movable anvil 172. This allows the second movable anvil 172 to move radially outward. The second movable anvil 172 is at least partially located radially outward from the outer circumferential surface 103 of the anvil 98.

The first hammer projection 841 reaches the second movable anvil 172 after the first spindle projection 691 reaches the second movable anvil 172. In other words, the first hammer projection 841 reaches the second movable anvil 172 after the second movable anvil 172 moves radially outward. The first hammer projection 841 strikes, in the rotation direction, the second movable anvil 172 located radially outward from the outer circumferential surface 103 of the anvil 98. In this state, the radial position of the second movable anvil 172 is restricted by the first spindle projection 691, and the circumferential position of the second movable anvil 172 is restricted by the inner surface of the corresponding anvil hole 104. The first hammer projection 841 thus strikes the second movable anvil 172.

The second spindle projection 692 reaches the first movable anvil 171 before the second hammer projection 842 reaches the first movable anvil 171. The first movable anvil 171 moves radially outward in response to the contact with the second spindle projection 692. The second hammer projection 842 reaches the first movable anvil 171 after the first movable anvil 171 moves radially outward. The second hammer projection 842 strikes, in the rotation direction, the first movable anvil 171 located radially outward from the outer circumferential surface 103 of the anvil 98. In this state, the radial position of the first movable anvil 171 is restricted by the second spindle projection 692, and the circumferential position of the first movable anvil 171 is restricted by the inner surface of the corresponding anvil hole 104. The second hammer projection 842 thus strikes the first movable anvil 171.

The first hammer projection 841 strikes the second movable anvil 172 substantially at the same time as the second hammer projection 842 strikes the first movable anvil 171.

The movable anvils 17 located in the anvil holes 104 in the tool holding shaft 15 are struck by the hammer projections 84. The tool holding shaft 15 is struck in the rotation direction by the hammer 75 with the two movable anvils 17 in between.

The tool holding shaft 15 that is struck in the rotation direction by the hammer 75 rotates about the rotation axis AX with high torque. The screw is thus fastened to the workpiece under high torque.

In the striking state shown in FIG. 23, as the cam ring 76 moves backward, each ball 77 moves to the middle of the corresponding spindle groove 71.

After completion of the striking operation, the electric work machine 1 transitions from the striking state to the low load state.

As described above with reference to FIGS. 14 to 23, the hammer projections 84 strike the movable anvils 17 at every half turn of the spindle 11 in the embodiment. In other words, in the embodiment, the hammer projections 84 strike the movable anvils 17 twice per rotation of the spindle 11. The hammer projections 84 may strike the movable anvils 17 once per rotation of the spindle 11. This allows the hammer projections 84 to strike the movable anvils 17 at a higher rotational speed and with a higher inertia than when striking the movable anvils 17 twice. In other words, the hammer 75 striking, with the hammer projections 84, the movable anvils 17 once per rotation of the spindle 11 can strike the movable anvils 17 with a higher striking force than when striking the movable anvils 17 twice. The rate at which the hammer projections 84 strike the movable anvils 17 per rotation of the spindle 11 can be adjusted by adjusting at least one of the elastic energy (spring constant) of the elastic member 78 or the rotational speed of the spindle 11. The hammer projections 84 start striking the movable anvils 17 earlier in response to the easiness of deformation of the elastic member 78. This reduces, as a secondary effect, camming out the tip end of the tip tool from the screw drive (cross hole) of the screw in the screwing operation.

In the present embodiment, the electric work machine 1 includes the two movable anvils 17 and the two hammer projections 84. The electric work machine 1 may include three movable anvils 17 and three hammer projections 84. The electric work machine 1 may include four movable anvils 17 and four hammer projections 84. The electric work machine 1 may include five or more movable anvils 17 and five or more hammer projections 84.

In the examples of FIGS. 14 to 23, the spindle 11, the cam ring 76, the hammer 75, and the tool holding shaft 15 rotate in the forward direction in the screwing operation. In an unscrewing operation, the operator operates the forward-reverse switch lever 41 to rotate the spindle 11, the cam ring 76, the hammer 75, and the tool holding shaft 15 in the reverse direction. In this state, when the tool holding shaft 15 enters the high load state and causes a decreased rotational speed of the cam ring 76 and the relative rotation between the cam ring 76 and the flange 11B, each ball 77 moves from the middle of corresponding spindle groove 71 toward the end in the first circumferential direction of the corresponding spindle groove 71. This causes the cam ring 76 to move forward under the force from the balls 77. After the hammer 75 unlocked, each ball 77 moves from the end in the first circumferential direction of the corresponding spindle groove 71 to the middle of the corresponding spindle groove 71, with the cam ring 76 under the elastic force from the elastic member 78 moving backward. This causes the cam ring 76 to move backward under the force from the balls 77, while rotating relative to the flange 11B.

The electric work machine 1 according to the embodiment includes the motor 6 including the stator 21 and the rotor 22 at least partially located inward from the stator 21 and rotatable about the rotation axis AX, the spindle 11 located frontward from the stator 21 in the front-rear direction parallel to the rotation axis AX and rotatable under the rotational force generated by the rotor 22, and the spindle bearing 12 supporting the rear portion of the spindle 11 in a rotatable manner. The spindle bearing 12 is located radially inward from the stator 21.

In the above structure, the spindle bearing 12 is located radially inward from the stator 21, and the spindle bearing 12 overlaps at least a part of the stator 21 in the front-rear direction. The electric work machine 1 thus has less size increase in the front-rear direction parallel to the rotation axis AX of the motor 6. The dimension of the electric work machine 1 in the front-rear direction parallel to the rotation axis AX of the motor 6 refers to the dimension in the front-rear direction between the rear end of the rear case 3 and the front end of the tool holding shaft 15. The electric work machine 1 according to the embodiment of the present disclosure has less increase in the dimension in the front-rear direction parallel to the rotation axis AX of the motor 6.

The stator 21 in the embodiment includes the stator core 23, and the insulator 26 at least partially fixed to the front portion of the stator core 23. The spindle bearing 12 is located radially inward from the insulator 26.

This structure allows the spindle bearing 12 to overlap at least a part of the insulator 26 in the front-rear direction. The electric work machine 1 thus has less size increase in the front-rear direction parallel to the rotation axis AX of the motor 6.

The electric work machine 1 according to the embodiment includes the bearing box 5 holding the spindle bearing 12. The insulator 26 is connected to the bearing box 5.

This restricts relative movement between the stator 21 and the bearing box 5.

The bearing box 5 in the embodiment may have the insertion holes 5H receiving the pins 28C included in the insulator 26.

The pins 28C placed in the insertion holes 5H connect the insulator 26 and the bearing box 5.

The bearing box 5 in the embodiment includes the tabs 5E each being a first tab in contact with the front end face of the stator core 23.

The stator 21 is thus supported by the tabs 5E in the bearing box 5.

The electric work machine 1 according to the embodiment includes the hammer case 4 accommodating the spindle 11. The bearing box 5 covers the opening at the rear end of the hammer case 4.

The bearing box 5 and the hammer case 4 are thus connected to each other.

The electric work machine 1 according to the embodiment further includes the rear case 3 accommodating at least a part of the motor 6, and the screws 20 fastening the rear case 3 and the hammer case 4 to each other.

This restricts relative movement between the rear case 3 and the hammer case 4.

Other Embodiments

In the above embodiment, the electric work machine 1 is an impact driver as an example of an impact tool. The impact tool may be an impact wrench. The electric work machine 1 may be a machine other than an impact tool. The structures according to the embodiments of the present disclosure are widely applicable to an electric work machine including a motor, a spindle, and a spindle bearing.

In the above embodiment, the electric work machine 1 may use utility power (alternating current power supply) instead of the battery pack 19.

REFERENCE SIGNS LIST 1 electric work machine
2 housing
2A compartment
2B grip
2C battery holder
2L left housing
2R right housing
3 rear case
3A cylindrical portion
3B disk
3C bearing retainer
3D screw boss
3E protrusion
3F screw opening
3G screw opening
4 hammer case
4A large cylindrical portion
4B small cylindrical portion
4C tab
4D screw boss
4E protrusion
4F threaded hole
4G screw opening
5 bearing box
5A large cylindrical portion
5B small cylindrical portion
5C front annular portion
5D rear annular portion
5E tab
5F rotation locking portion
5G boss
5H insertion hole
5J recess
5K recess
6 motor
7 fan
7A bush
8 rear rotor bearing
9 front rotor bearing
10 reducer
11 spindle
11A spindle shaft
11B flange
11C pin support
11D joint
11E protrusion
12 spindle bearing
13 striker
14 hammer bearing
15 tool holding shaft
16 shaft bearing
17 movable anvil
18 tool holder
19 battery pack
20 screw
21 stator
22 rotor
23 stator core
24 inner core 24A inner yoke
24B tooth
24C joint
25 outer core
25A recess
26 insulator
27 rear insulator portion
27A rear plate
27D support plate
28 front insulator portion
28A front plate
28B columnar portion
28C pin
28D support plate
29 coil
30 connecting wire
31 fusing terminal
32 rotor magnet
33 rotor shaft
33A magnet fixing portion
33B fan fixing portion
33C rear support
33D front support
40 trigger lever
41 forward-reverse switch lever
48 pinion gear
58 planetary gear
59 pin
60 internal gear
62 protrusion
69 spindle projection
70 ball groove
71 spindle groove
74 washer
75 hammer
76 cam ring
77 ball
78 elastic member
79 washer
80 rotation ball
81 rear outer cylinder
82 front outer cylinder
83 inner cylinder
84 hammer projection
85 ball groove
86 guide groove
87 cam slide
88 cam groove
89 recess
90 support surface
91 disc spring
93 screw
94 threaded hole
95 front end face
96 facing surface
97 tool holding portion
98 anvil
99 tool hole
100 recess
101 inner circumferential surface
103 outer circumferential surface
104 anvil hole
105 support recess
106 support ball
107 O-ring
108 stopper
110 holding ball
111 leaf spring
112 sleeve
113 coil spring
114 positioner
115 support recess
171 first movable anvil
172 second movable anvil
691 first spindle projection
692 second spindle projection
841 first hammer projection
842 second hammer projection
AX rotation axis

What is claimed is:

1. An electric work machine, comprising:
a motor including
a stator including a stator core and an insulator at least partially fixed to a front portion of the stator core, and
a rotor at least partially located radially inward from the stator, the rotor being rotatable about a rotation axis;
a spindle located frontward from the stator core in a front-rear direction parallel to the rotation axis, the spindle being rotatable under a rotational force generated by the rotor;
a spindle bearing supporting a rear portion of the spindle in a rotatable manner, the spindle bearing being located radially inward from the stator; and
a bearing box holding the spindle bearing, wherein
the insulator is connected to the bearing box, and
the spindle bearing and the stator at least partially overlap each other in the radial direction and at least partially located at a same position in the front-rear direction.

2. The electric work machine according to claim 1, wherein the bearing box has an insertion hole receiving a pin included in the insulator.

3. The electric work machine according to claim 2, wherein the bearing box includes a first tab in contact with a front end face of the stator core.

4. The electric work machine according to claim 2, further comprising:
a hammer case accommodating the spindle,
wherein the bearing box covers an opening at a rear end of the hammer case.

5. The electric work machine according to claim 1, further comprising:
a hammer case accommodating the spindle,
wherein the bearing box covers an opening at a rear end of the hammer case.

6. The electric work machine according to claim 5, further comprising:
a rear case accommodating at least a part of the motor; and
a screw fastening the rear case and the hammer case to each other.

7. An electric impact tool, comprising:
a motor including
a stator including a stator core and an insulator at least partially fixed to a front portion of the stator core, and
a rotor at least partially located radially inward from the stator, the rotor being rotatable about a rotation axis;
a spindle extending in a front-rear direction parallel to the rotation axis, the spindle being rotatable under a rotational force generated by the rotor;
a spindle bearing supporting a rear portion of the spindle in a rotatable manner, the spindle bearing being located radially inward from the insulator;

a rotor bearing supporting a front portion of the rotor in a rotatable manner, the rotor bearing being located radially inward of the spindle bearing; and a bearing box holding the spindle bearing, wherein the spindle bearing and the insulator at least partially overlap each other in the front-rear direction, and the spindle bearing, the rotor bearing and the insulator at least partially overlap each other in the radial direction and at least partially located at a same position in the front-rear direction.

8. The electric impact tool according to claim 7, wherein a rear portion of the spindle holds the rotor bearing, and the rear portion of the spindle is held between the spindle bearing and the rotor bearing.

9. The electric impact tool according to claim 7, wherein a rear portion of the bearing box and the insulator at least partially overlap each other in the radial direction and at least partially located at a same position in the front-rear direction.

10. The electric impact tool according to claim 7, wherein a rear portion of the bearing box includes a ring, and the ring is located rearward from the spindle bearing.

11. The electric impact tool according to claim 7, further comprising:

a coil held by the insulator, wherein the spindle bearing, the rotor bearing and the coil at least partially overlap each other in the front-rear direction and at least partially located at a same position in the radial direction.

12. An electric work machine, comprising:

a motor including a stator, and a rotor at least partially located radially inward from the stator, the rotor being rotatable about a rotation axis;

a spindle extending in a front-rear direction parallel to the rotation axis, the spindle being rotatable under a rotational force generated by the rotor;

a spindle bearing supporting a rear portion of the spindle in a rotatable manner, the spindle bearing being located radially inward from the stator; and a bearing box holding the spindle bearing, wherein the stator includes a stator core, and an insulator at least partially fixed to a front portion of the stator core, and the spindle bearing is located radially inward from the insulator, the insulator is connected to the bearing box, and the bearing box contacts a front portion of the stator.

13. The electric work machine according to claim 12, further comprising:

a hammer case accommodating the spindle, wherein the bearing box covers an opening at a rear end of the hammer case.

14. An electric work machine, comprising:

a motor including a stator, and a rotor at least partially located radially inward from the stator, the rotor being rotatable about a rotation axis;

a spindle extending in a front-rear direction parallel to the rotation axis, the spindle being rotatable under a rotational force generated by the rotor;

a spindle bearing supporting a rear portion of the spindle in a rotatable manner, the spindle bearing being located radially inward from the stator;

a bearing box holding the spindle bearing;

a hammer case accommodating the spindle;

a rear case accommodating at least a part of the motor; and a screw fastening the rear case and the hammer case to each other, wherein the stator includes a stator core, and an insulator at least partially fixed to a front portion of the stator core, and the spindle bearing is located radially inward from the insulator, the insulator is connected to the bearing box, the bearing box covers an opening at a rear end of the hammer case, and the hammer case includes a tab in contact with a front end face of the rear case.

\* \* \* \* \*